United States Patent [19]

Russell et al.

[11] Patent Number: 4,663,744
[45] Date of Patent: May 5, 1987

[54] REAL TIME SEISMIC TELEMETRY SYSTEM

[75] Inventors: William F. Russell; William W. Bryce, both of Dallas, Tex.

[73] Assignee: Terra Marine Engineering, Inc., Dallas, Tex.

[21] Appl. No.: 528,040

[22] Filed: Aug. 31, 1983

[51] Int. Cl.[4] .............................................. G01V 1/22
[52] U.S. Cl. ...................................... 367/76; 367/78; 367/79; 340/870.13; 340/870.14
[58] Field of Search .................................... 367/76–79; 340/870.13, 870.14

[56] References Cited

U.S. PATENT DOCUMENTS

| | | | |
|---|---|---|---|
| 3,325,778 | 6/1967 | Ballard | 367/21 |
| 3,721,835 | 3/1973 | Hess | 307/553 |
| 3,764,922 | 10/1973 | Gilbert et al. | 328/162 |
| 3,819,864 | 6/1974 | Carroll et al. | 370/113 |
| 3,873,961 | 3/1975 | Lee et al. | 367/79 |
| 3,886,494 | 5/1975 | Kostelnicek et al. | 367/77 |
| 3,938,073 | 2/1976 | Fort et al. | 367/79 |
| 3,990,036 | 11/1976 | Savit | 367/135 |
| 4,005,273 | 1/1977 | Siems | 370/113 |
| 4,023,140 | 5/1977 | Siems et al. | 367/79 |
| 4,042,906 | 8/1977 | Ezell | 367/77 |

Primary Examiner—Thomas H. Tarcza
Assistant Examiner—Ian J. Lobo
Attorney, Agent, or Firm—Jerry W. Mills; Gregory M. Howison

[57] ABSTRACT

A real time seismic telemetry system includes a central station (10) for communication with a plurality of remote data acquistion units (14). The command station (10) has a command unit (34) for controlling the operation of a transmitter (40) for providing instructions to the data acquistion units (14). The data acquistion units (14) receive the data on a receiver (80) and process the data in a logic control circuit (88). Remote data is picked up with a hydrophone (30) and converted to digital data for transmission through a transmitter (78) which is tuned to a discrete channel for each data acquistion unit (14). The command station (10) has a PCM receiver (62) tuned to each of the channels for demodulating the data stream therefrom. A digital receiver (66) is provided for synchronizing and processing the data. The digital receiver (66) synchronizes both to the bit rate and to the beginning and ending of the digital word such that data contained in the digital word can be multiplexed onto a data bus (68). The data bus (68) is controlled by an external storage/control (70) for storage of the data from all of the digital receivers (66) for all of the discrete channels.

20 Claims, 20 Drawing Figures

STATUS PARAMETER

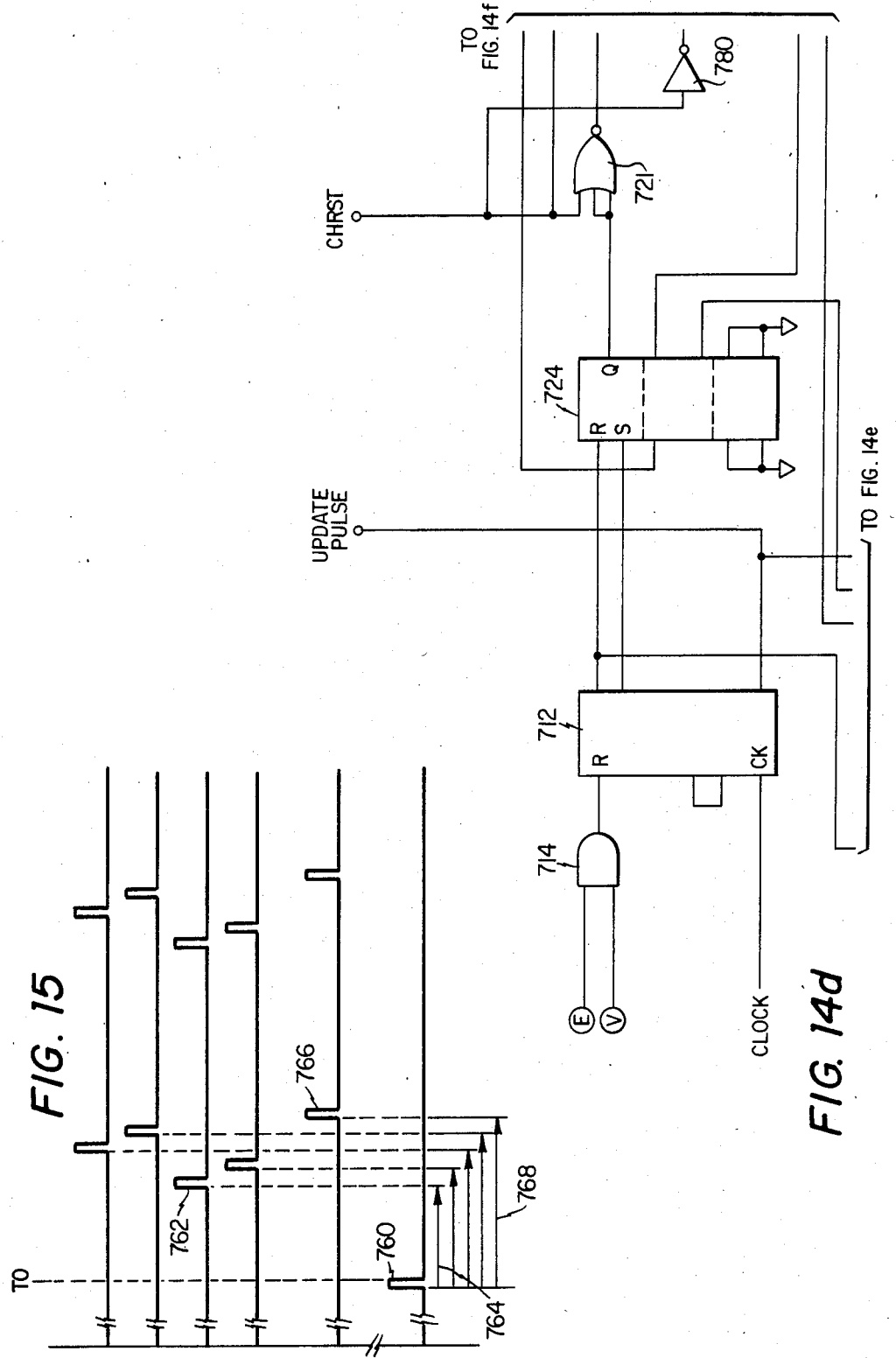

REAL TIME SEISMIC TELEMETRY SYSTEM

TECHNICAL FIELD OF THE INVENTION

This invention pertains to apparatus for collecting seismic data and, in particular, to real time seismic telemetry systems for collecting data from a plurality of remote data acquisition units that communicate the seismic data to a central location for processing thereof.

BACKGROUND OF THE INVENTION

Real time seismic telemetry systems require a plurality of data acquisition units to be disposed along a seismic line for sensing seismic waves in the earth's crust. Normally, these seismic waves are artificially induced to create a wavefront that can be measured as it passes the remote data acquisition units. The data that is collected is normally in analog form which is obtained from a transducer such as a geophone or a hydrophone. Each of the remote data acquisition units is oriented such that they take data at a plurality of points disposed remote from a central shock creating device. By examining this data, scientists can utilize analytical models of the structure of the substrata in the locale of the transducers.

In order to collect all of the data from the data acquisition units, the central location must be able to recognize the particular data acquisition unit from which the data has been received and store this data in an appropriate medium in association with the location data. The format for the storing of this data has been provided by the Society of Exploration Geophysicists such that the data can be analyzed and correlated at a later time. This data is normally stored as digital words in a predetermined way. Therefore, it is necessary for the central station to arrange the data from the various data acquisition units according to the proper format.

To achieve proper time correlation of the data after reception and storage, it is necessary that all of the sampled data for a particular sample in time be stored such that retrieval from the digital form allows correlation of the data without introducing a time error between the samples. For systems which receive all of the analog data at a central system in a multiplex form, this presents very few problems with receiving the data and processing since systems of this type normally utilize a common clock, that is, all data acquisition units are synchronized to the same clock. Normally, systems of this type are hardwire systems which require a separate line for the clock and possibly a separate line for some control signals.

Hardwire systems sometimes are inappropriate for the application and a wireless system must be utilized. For these systems that utilize a real time data link, the analog data must be modulated onto a carrier and transmitted over a plurality of discrete channels and then multiplexed at the central station. Since only certain portions of the frequency spectrum are available for use, the portion chosen must be relatively free for use by the transmitters, that is, a relatively dedicated channel. Unfortunately, there are very few portions of the frequency spectrum that can be allocated to a particular use, thus requiring a system to operate in a relatively narrow portion of the spectrum.

In order to operate a large number of discrete channels over a narrow portion of the frequency spectrum, the modulation technique utilized is of prime importance. Most of the efficient modulation techniques utilize transmission of digital words in either a frequency shift key (FSK) or phase shift modulation (PSM). The fundamental frequency for these modulation techniques is normally the bit rate clock of the digital word. This, of course, depends upon the number of bits transmitted for each digital word, each digital word being transmitted at the sampling rate thereof. Since the sampling rate is on the order of 1 KHz, the bit rate of the digital word is much higher than this rate and is determined by the number of bits that is required to encode the data with the proper resolution and the number of bits required for synchronization of the word at the central location. Since the clock that is used to generate the digital word at the data acquisition unit is not available to the central location at which the digital word is processed, it is necessary for the central location to recognize the beginning and end of each of the digital words. This is normally done by including a number of synchronizing bits that precede each digital word. However, the more synchronizing bits that are required to be present in the digital word, the higher the bit rate clock must be. This, in turn, increases the transmission bandwidth that is required for transmission of the digital data. Therefore, it is necessary to minimize the number of bits transmitted while retaining the data resolution therein to conserve bandwidth.

Upon reception of the data, it is necessary to receive the signal over the data link and achieve bit synchronization and word synchronization in as short a time as possible. This is due to the fact that in some instances the initial data transmitted is important and must be retrieved. In addition, it is necessary that the central location maintain synchronization with all of the remote data acquisition units at all times during transmission of the data in order to achieve a high degree of accuracy for each measurement taken. Such things as noise and the distance of the data acquisition units from the central location can cause noise to interfere with reception of the data. This noise results in "garbled" data that is useless for correlation or other purposes and must be taken into consideration.

Once the data is received, it is necessary, as described above, to store the data in digital form. If the data is transmitted in digital form, it is relatively easy to store the data in this format in the storage medium. However, a problem exists in that all of the clocks that generate the bit frequency in each of the remote units are not synchronous, that is, they are asynchronous. Although the digital words are received on a common time base, storage of the digital words onto the storage medium erases any time base to determine the "skew" between the different remote units. This lack of skew information results in a system error when the data is reconstituted and analyzed since any central processing system will assume that all the clocks of the remote units are synchronous. It is therefore necessary to provide some type of correction factor or signal to indicate what the skew actually is such that, upon reconstitution of the signal, the skew between various remote units can be determined.

In view of the above, there exists a need for a real time seismic telemetry system that provides a data acquisition unit for disposal at a remote location that operates over a wireless data link and occupies a very narrow portion of the allowed bandwidth for the entire system. The central processing system for receiving the data from the remote units must have the capability to retrieve the data in as complete a form as possible and store this data on a storage medium taking into effect the relative skew between the various remote units. In addition, the modulating system used over the data link must provide very efficient use of the allocated bandwidth.

SUMMARY OF THE INVENTION

The present invention disclosed and claimed herein comprises a seismic telemetry system for measuring data at a remote location and transferring this data in coded form to a central location for storage thereof. The telemetry system includes a data link, a transmitter and a plurality of remote data acquisition units for measuring data. The transmitter transmits a synchronizing signal over the data link for reception by the remote data acquisition units. Each of the remote data acquisition units has a local clock disposed thereon that is asynchronous with respect to the other clocks on the other data acquisition units. A receiver receives the synchronizing signal which is then synchronized with the local clock on each of the data acquisition units on a common time base. Each of the local clocks operates synchronously during the presence of the synchronization signal and asynchronously when the synchronizing signal is removed.

A pre-synchronizing signal is also transmitted before the synchronizing signal to prepare the remote data acquisition units for reception of the synchronizing signal and synchronization thereto. The synchronizing signal is a single frequency analog signal and the local clock is initiated at a predetermined phase of the synchronizing signal. An inhibiting circuit prevents the synchronizing signal from synchronizing the local clocks unless it is preceded by the pre-synchronization signal.

A method for synchronizing the clock frequencies of the remote data acquisition units is provided that includes transmitting a synchronization signal over the data link and receiving the synchronization signal at each of the data acquisition units. The clock frequencies of each of the data acquisition units are then synchronized to a common time base in response to the presence of the synchronizing signal. During the presence of the synchronizing signal, each of the clocks is operating on a common time base whereas removal of the synchronizing signal allows the clocks to operate on a separate time base relative to other data acquisition units. Prior to transmitting the synchronization signal, the pre-synchronization signal is transmitted and reception of the synchronization signal is inhibited unless preceded by the pre-synchronization signal.

In another embodiment of the present invention, the remote data acquisition units include an encoder for encoding the seismic data into digital words with each of the digital words having n-bits with at least one predetermined bit. A transmitter is provided for transmitting the digital words in a serial bit stream on the data link to a central station for receiving the digital bit stream. The central station has a receiver that can recognize the initial bit and the n'th bit of each of the digital words by the occurrence of the predetermined bit such that word synchronization is achieved. The digital words are then stored in an external storage device at the central station.

The portion of the receiver for recognizing the initial bit includes a circuit for isolating an n-bit segment of the received data stream and a sampling circuit for sampling the bit of the isolated segment at the position of the predetermined bit in the digital word. The sampled bit is then compared to a reference to determine if the logic state thereof matches the logic state of the predetermined bit. If a true comparison is made, the digital word is stored and the bit stream is incremented in segments of n-bits such that complete ones of the digital word are stored.

In yet another embodiment of the present invention, each of the data acquisition units arranges the digital words into frames of words and encodes operating parameter information therein. The words are arranged in a predetermined manner to form a frame of digital words and an identifier is associated with one of the digital words in the frame such that a reference is established. The receiver at the central station recognizes the frame of digital words by recognizing the identifier. The sequence is then decoded after recognition of the identifier according to the predetermined sequence.

In a yet further embodiment of the present invention, a signal is output at the receiver in the command station to indicate the skew of the digital words received from each of the data acquisition units. The skew signal is stored in the external storage at the command station such that the relative time of the seismic data sample of each of the data acquisition units is associated with the seismic data obtained from a particular one thereof. The skew signal is generated by generating a periodic time reference that is common to each of the receivers at the command station. An update signal is then generated for each of the bit streams associated with particular data acquisition units, the update signal synchronized to the digital words therein. A counter is provided for counting the interval of time between the common time reference and the occurrence of the update signal such that a relative time interval is obtained for all of the receivers in the central station to provide an indication of the skew rate between the bit rates of the bit streams transmitted by each of the data acquisition units.

In a yet further embodiment of the present invention, the seismic telemetry system includes a pulse code modulation system for modulating the transmitter with the digital information. A pulse generator is provided to encode the digital information into a pulse waveform having a plurality of positive and negative going transitions that vary between a first voltage level and a second voltage level and having a harmonic rich frequency spectrum. A shaping circuit shapes the pulse waveform to minimize the harmonics therein. The shaping circuit includes a first filter for filtering low frequency components of the pulse waveform and an integrator for integrating the output thereof. A second filter filters the output of the integrator and a portion of this output is summed on the input of the integrator such that each of the positive and negative transitions occurs within the time duration of the single bit. A phase lock loop is provided for phase modulating the transmitter with the shaped waveform. By shaping the waveform, the maximum rate of change is minimized.

BRIEF DESCRIPTION OF THE DRAWING

For a more complete understanding of the present invention and the advantages thereof, reference is now made to the following description taken in conjunction with the accompanying Drawings in which:

FIGS. 14a-f illustrate a schematic diagram of the digital receiver; and

FIG. 15 illustrates timing diagrams for the skew measurement utilizing the update pulses.

DETAILED DESCRIPTION OF THE INVENTION

GENERAL DESCRIPTION OF THE SYSTEM

Figure 1:
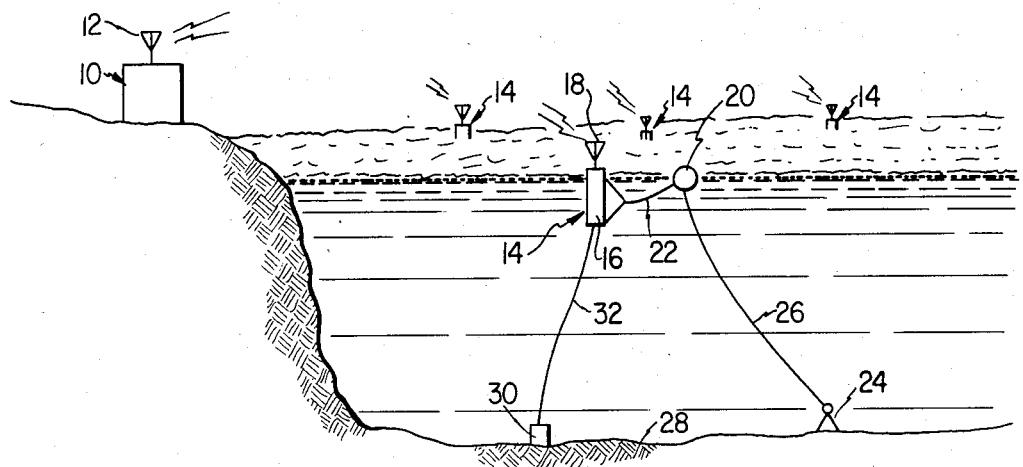
FIG. 1 illustrates a perspective view of the overall seismic telemetry system.

Referring now to FIG. 1, there is illustrated a perspective view of the seismic telemetry system of the present invention. The system comprises a command station 10 disposed on a solid location with an antenna 12 attached thereto for operating over a wireless data link. A plurality of remote data acquisition units 14 (hereinafter referred to as "DAU"'s) are disposed at select remote locations from the command station 10. Each of the DAU's 14 is comprised of a cylindrical body 16 that is operable to support electronics therein and maintain buoyancy at the surface level and an antenna 18 disposed on the portion of the body 16 that extends above the water. The antenna 18 is operable to transmit over and receive information from the wireless data link to communicate with the command station 10. The cylindrical body 16 is attached to a float 20 by a cable 22. The float 20 is attached to an anchor 24 through an anchor cable 26, the anchor 24 resting upon a sea bottom 28. A hydrophone 30 also rests on the sea bottom and is attached to the DAU 14 through a sensing cable 32. The hydrophone 30 is operable to sense seismic data in the general location thereof. Although a hydrophone has been illustrated, it should be understood that any seismic transducer may be used, such as a geophone.

The hydrophones 30 that are attached to the DAU's 14 are laid along a seismic line such that a plurality of data points can be obtained at predetermined distances. The hydrophones 30 are then connected to an associated one of the DAU's 14. The distance between adjacent ones of the DAU's 14 is in the range of from 10 to 100 meters. At this spacing, the distance between the command station 10 and the string of DAU's 14 can be up to 10 miles, but this depends upon the particular layout utilized.

Each DAU 14 transmits and receives over the data link, which is a radio frequency (RF) data link for reception at the command station 10 in order to communicate with the command station 10. Since each DAU 14 transmits data received from a separate hydrophone 30, it is necessary to distinguish the DAU's 14 at the command station 10. This is accomplished by utilizing discrete channels in the RF spectrum associated with each of the DAU's 14. In order to preserve dynamic range and the signal to noise ratio in the transmission system, it is necessary to have a transmission system that utilizes appropriate modulation techniques and bandwidth conservation techniques to operate in a given portion of the frequency spectrum. In the preferred embodiment, the system occupies the RF frequency spectrum from 72 MHz to 76 MHz. Although much wider portions of the spectrum can be utilized, it is not practical to do so since overcrowding of the spectrum is severe in certain areas and only certain portions are relatively free for general use. As there are many factors to consider when choosing a frequency band to operate in, such as cost, transmission properties at certain wavelengths, power efficiencies and circuit realization techniques, the practical constraints of developing a wireless telemetry system normally result in utilization of a very small portion of the spectrum, resulting in a very narrow overall system bandwidth.

In a normal seismic data acquisition system, anywhere from 72 to 240 hydrophones may be utilized. Since each hydrophone is associated with a separate DAU 14, a discrete channel must be reserved for each hydrophone/DAU combination. Therefore, up to 240 channels may have to be accommodated in the 4 MHz bandwidth. As will be described hereinbelow, this is achieved by utilizing the appropriate modulation technique in conjunction with various bandwidth conservation techniques.

Figure 2:
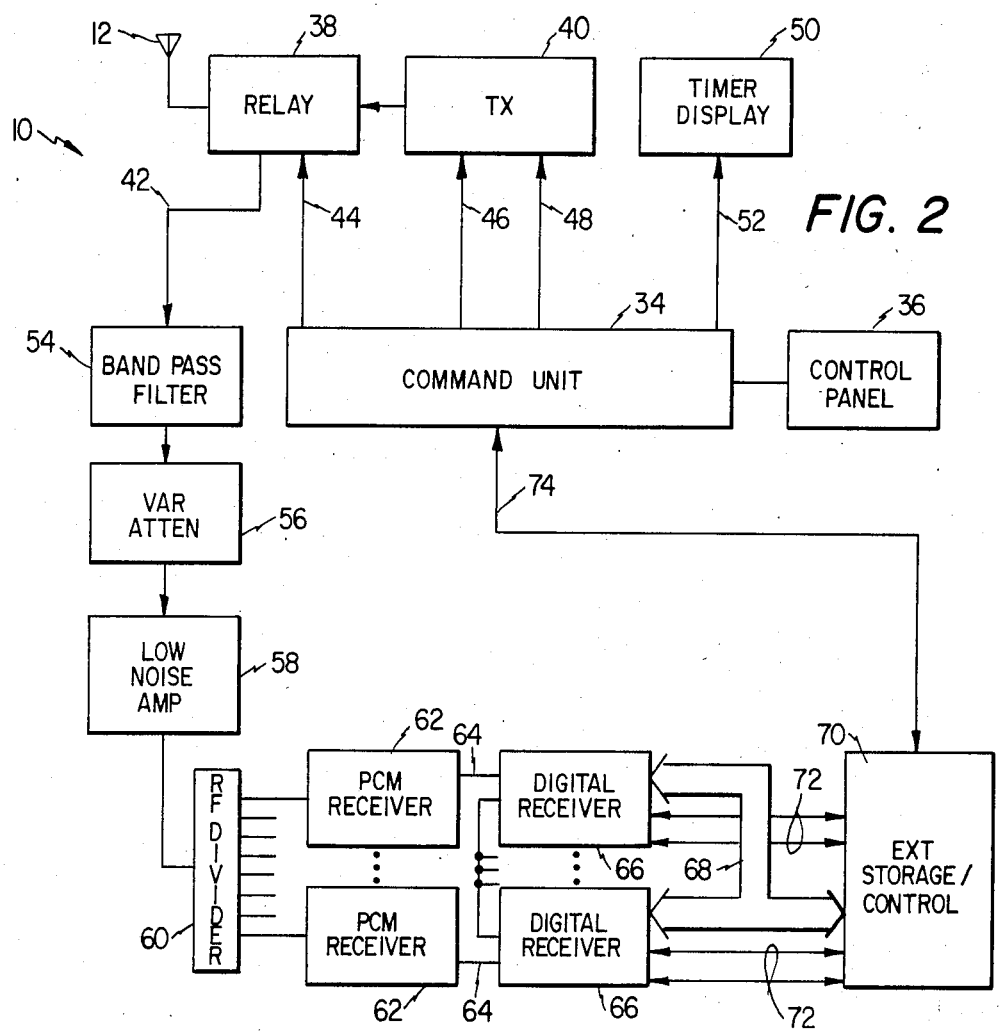
FIG. 2 illustrates a block diagram of the command station for controlling the remote data acquisition units.

Referring now to FIG. 2, there is illustrated a block diagram of the command station 10. The command station 10 is comprised of a command unit 34 which has a control panel 36 connected thereto. The command unit 34, as will be described hereinbelow, is operable to generate a plurality of commands that control both transmission and reception by the antenna 12 and the transmission and reception of the DAU's 14. The antenna 12 is connected to one port of a relay 38 and a transmitter 40 has the output thereof connected to another port of the relay 38. The relay 38 is operable in the transmit mode to receive a signal from the transmitter 40 and output it to the antenna 12 and, in the receive mode, to receive an RF signal from the antenna 12 and route it to an output port 42 on the relay 38. The output 42 comprises the received data. A control line 44 is connected between the command unit and the relay 38 to provide the control signal therefore to determine whether the relay is in the transmit mode. The transmitter 40 has data input thereto through a data line 46 and control signals therefor are input through a control line 48. The command unit 34 determines the data which is to be modulated onto the transmitter 40 and inputs this data along the line 46 and, in addition, determines whether the transmitter 40 is to be activated by signals on the control line 48. A timer display 50 is also connected to the command unit 34 through a signal line 52 to measure the on time of the DAU's 14.

The receive signal on the relay 38 is passed through the receive port to a bandpass filter. The bandpass filter 54 is generally a system filter that rejects all frequencies outside of the operating band that is allocated to the system, and passes all frequencies within the band with minimal insertion loss therein. The filter 54 prevents large extraneous signals from degrading the dynamic range of the system. The output of the bandpass filter is input to a variable attenuator 56 to select an attenuation therefor. The variable attenuator 56 allows the dynamic range of the system to be adjusted such that RF signals from all of the DAU's 14 can be attenuated. High RF levels may result from the command station being disposed relatively close to the seismic data line. The output of the variable attenuator is then input to a low noise amplifier (LNA) 58 to prevent successive system elements from severely degrading the system sensitivity.

The output of the LNA 58 is input to a power divider 60 which divides the signal output by the LNA 58 to a plurality of output ports. Since each of the DAU's 14 operates on a discrete channel at a discrete frequency, it is necessary to provide a discrete receiver for each of the DAU's 14. This is accomplished with the power divider 60. The power divider 60 merely provides a means for dividing the power while maintaining the correct impedance match and, in addition, provides some isolation from channel to channel.

Each of the plurality of outputs of the power divider 60 is connected to an individual pulse code modulation (PCM) receiver 62. Each of the PCM receivers 62 is tuned to one of discrete frequencies for receiving the transmitted data from the associated one of the DAU's 14. The PCM receiver 62 selects the appropriate frequency, demodulates the carrier and decodes the data. The output of the PCM receiver 62 consists of PCM data. This data is transmitted along a PCM data signal line 64 as a digital bit stream to a digital receiver 66. The digital receiver 66 obtains synchronization with the serial bit stream and outputs the proper sequence of digital words that represent the digital data. The digital words are output on a data bus 68 that is multiplexed between the digital receivers 66 that are associated with each of the PCM receivers 62. The data bus 68 is also connected to an external storage/control device 70 that is operable to store the data output by the digital receiver 66 and also output control signals for various functions, as will be described hereinbelow. These various other functions are either output as part of the data bus 68 or on signal lines 72. The external storage/control device 70 is in communication with the command unit 34 through a signal line 74.

Figure 3:
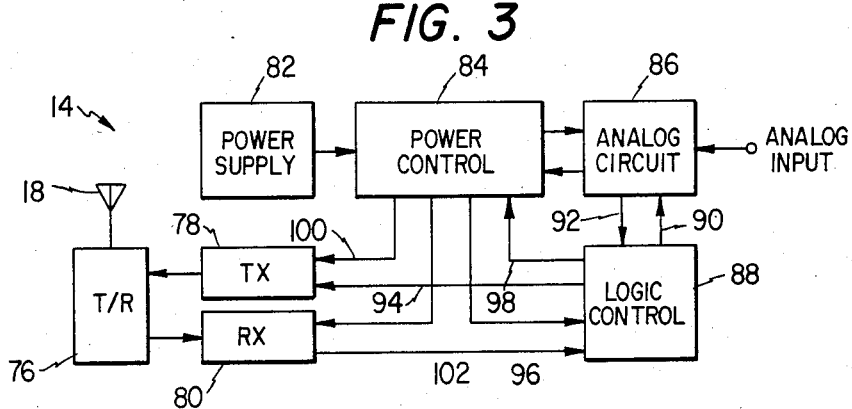
FIG. 3 illustrates a block diagram of a remote data acquisition unit.

Referring now to FIG. 3, there is illustrated a block diagram of the DAU 14. The antenna 18 is connected to a transmit/receive (T/R) switch 76 to selectively connect a transmitter 78 or a receiver 80 to the antenna 18. When the transmitter 78 is connected to the antenna 18, encoded data is transmitted over the data link to the command station 10 and, when the receiver 80 is connected to the antenna 18, data from the command station 10 is received by the DAU 14.

A power supply 82 is provided to provide power to the DAU 14. This is normally in the form of batteries. The power supply 82 is connected to a power control circuit 84 which controls the distribution of power from the power supply 82 to the various components on the board. As will be described hereinbelow, each of the DAU's 14 has various modes which, in order to conserve power, do not operate at all times. An analog circuit 86 is connected to the power control board 84 for control thereof and to an analog input which is connected to the hydrophone 30. The analog circuit 86 basically processes the analog data. A logic control circuit 88 contains the internal clock of the DAU 14 and the processing circuitry to convert the analog signal into digital words. This is accomplished with an analog to digital (A/D) converter which converts samples at the sampling rate required to obtain the proper system response. The analog data is digitized to the desired resolution and in the appropriate format for input to the transmitter 78.

The logic control circuit 88 is connected to the analog circuit 86 through signal lines 90 and 92. The processed digital data is output on a signal line 94 to the transmitter 78 for modulation on the RF carrier. Data received by the receiver 80 is input to the logic control circuit 88 on a signal line 96. A control line 98 is connected between the logic control circuit 88 and the power control circuit 84 to provide signals therebetween such that the receiver 80 and transmitter 78 can be controlled. To conserve energy in the power supply 82 and to prevent interference between the transmitter 78 and the receiver 80, control lines 100 and 102 are connected to the transmitter 78 and receiver 80, respectively, from the control circuit 84. The control circuit 84 controls the power thereto such that the transmitter 78 is turned on only during transmission of data and the receiver 80 turned off during that time whereas the receiver 80 is turned on only during reception from the data link with the transmitter 78 turned off at that time. For power conservation purposes, the transmitter 78, which has a relatively higher power consumption than other components in the DAU 14, is only turned on when required. However, the receiver 80 does not require that much standby power but interference considerations may require that it be turned off during transmission of data.

Referring now to FIGS. 1–3, the general system operation will be described. To conserve power, the DAU's 14 have a standby mode and a data mode. In the standby mode, part of the receivers 80 are turned on to "listen" to the data link for a transmission. In the preferred embodiment, all of the DAU's 14 have their receivers 80 tuned to a single frequency. In this manner, they are all "listening" for the same signal. This signal is transmitted by the command station 10 to indicate to all of the DAU's 14 that data is about to be taken. Since the data taken by the hydrophones 30 is normally in response to an artificially created seismic shock, it is not necessary to have the DAU's 14 running until just prior to creation of the shock. When the receiver 80 receives the initial signal, the remaining portions of each of the DAU's 14 are put into a "data ready" mode. In this mode, the DAU's 14 are able to receive various types of data indicating to them the manner in which they are to operate such as the time interval over which the DAU's 14 operate, when they should "power up" and when they should transmit data. After a signal is received from the command station 10 to prepare the DAU's 14, portions thereof are activated such that power is provided to the appropriate circuits to transmit data. As will be described hereinbelow, a status code is initially sent by each DAU 14 to indicate to the command station 10 various parameters of the DAU 14 such as internal voltages, unique code numbers and even indications that the internal battery has a low voltage level or that water is inside the cylindrical body 16 of the DAU 14.

This status signal is transmitted for approximately 1 to 10 seconds and then the data is transmitted in a serial bit stream. This digital bit stream will continue for the time interval that was originally input to each of the DAU's 14. The data received as digital words is then recovered from the RF carrier and stored in the external storage/control 70 of the command station 10 for later analysis. If the data is to be stored on a magnetic storage medium, the format utilized for this data storage is determined by the Society of Exploration Geophysicists and it is a standard format of storage. However, the data may be stored in any storage medium.

DATA ACQUISITION UNIT

Figure 4:
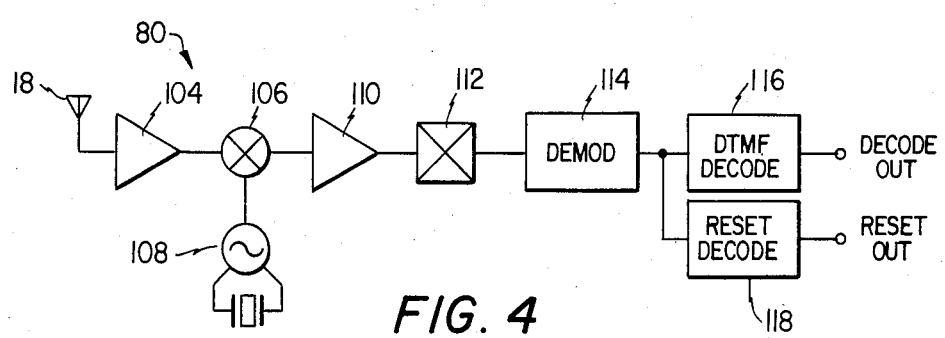
FIG. 4 illustrates a block diagram of the receiver portion of the transceiver on the remote data acquisition unit.

Referring now to FIG. 4, there is illustrated a block diagram of the receiver 80 on the DAU 14. A low noise amplifier 104 has the input thereof connected to the antenna 18 and the other end thereof connected to the RF input of a mixer 106. A crystal controlled oscillator 108 has the output thereof connected to the local oscillator input of the mixer 106. The output of the mixer 106 is connected to the input of an intermediate frequency (IF) amplifier 110. The gains of the amplifiers 104 and 110 are designed such that the dynamic range of the receiver will accommodate all signal levels that are transmitted to the antenna 18 and received on the input of the amplifier 104. The output of the IF amplifier 110 is input to an IF filter 112 that is typically centered at a frequency of 10.7 MHz, which is a standard frequency in the communications industry. After processing by the filter, the signal is input to a demodulator 114. This demodulator 114 demodulates the data from the RF carrier. In the preferred embodiment, the data that is encoded on the RF carrier transmitted from the command station 10 is dual tone multi-frequency (DTMF) data. This data is input to either a DTMF decoder 116 or a reset decoder 118. The DTMF decoder receives the DTMF data and outputs a signal corresponding thereto. The reset decoder 118 tone decodes the signal and generates reset pulses, the operation of which will be described hereinbelow. It should be understood that any modulation system that can provide information as to a number of parameters to control the various DAU's 14 would be acceptable.

In the preferred embodiment, the command station 10 transmits a signal on a frequency of approximately 73 MHz, which is in the middle of the system band, and which is received simultaneously by all of the DAU's 14. In this manner, all DAU's 14 can be controlled. Although not shown, it should be understood that the DAU's 14 can be coded for selective control thereof such that only individual ones of the DAU's 14 will be turned on or, alternately, groups of DAU's 14 can be selectively turned on. This would allow a higher degree of versatility in collecting seismic data.

Figure 5:
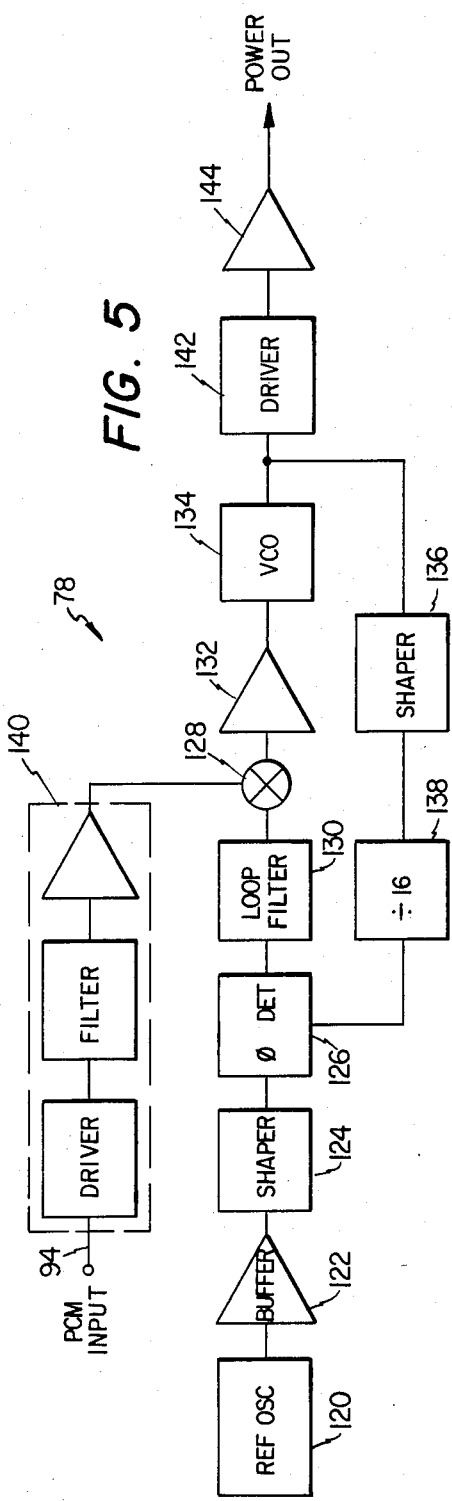
FIG. 5 illustrates a block diagram of the transmitter portion of the transceiver on the remote data acquisition unit.

Referring now to FIG. 5, there is illustrated a block diagram of the transmitter 78 in the DAU 14. The transmitter 78 is basically a phase lock loop (PLL) with phase modulation therefore. However, it should be understood that frequency shift key (FSK) modulation can also be used. A reference is provided for the PLL with a crystal reference oscillator 120 which is buffered through a buffer amp 122. The output of the buffer amp 122 is input to a squaring circuit 124 for shaping the waveform output by the buffer 122. The output of the squaring circuit 124 is input to one input of a phase detector 126. The output of the phase detector 126 is input to a loop filter 130 that provides the proper frequency response for the PLL. The output of the loop filter 130 is input to a summing junction 128 for summing of a modulation signal with the loop filter 130 output. The output of the summing junction 128 is input to a loop amplifier 132 which drives a VCO 134. The output of the VCO 134 is input to a squaring circuit 136 for input to a divider 138. The divider 138 divides the signal output by the VCO 134 by a factor of 16 and this signal is input to the other input of the phase detector 126 for comparison with the reference signal generated in the reference oscillator 120. Therefore, the frequency of the reference oscillator 120 is equal to the frequency output by the divider 138 which is the divided frequency of the VCO 134. The filtered output from the loop amp 132 comprises the error signal that sets the frequency output by the VCO 134. This error signal is modulated by a modulation signal that is input to the summing junction 128 from a modulation driver 140. This modulates the phase of the VCO 134 to provide a phase modulated output. The output from the VCO 134 is input to a driver 142 to provide power amplification thereof and the output of the driver 142 is input to a power amp 144 to provide the output power for the DAU 14.

By utilizing a VCO at the crystal frequency and modulating the input thereof, a more stable output frequency with fewer out of band harmonics can be achieved. Other techniques, such as multiplying the frequency output of a stabilized reference source or mixing two frequencies together, require a large number of filters to remove unwanted harmonics thereof. By utilizing the phase lock loop technique, it is possible to use a reference oscillator having a much lower frequency, thereby allowing the use of a lower frequency crystal therein to provide more stability. The crystal in the reference oscillator 120 is selectable to determine the output frequency of the VCO 134. By changing this crystal, one of the discrete channels allocated for operation of the DAU's 14 can be selected.

Figure 6:
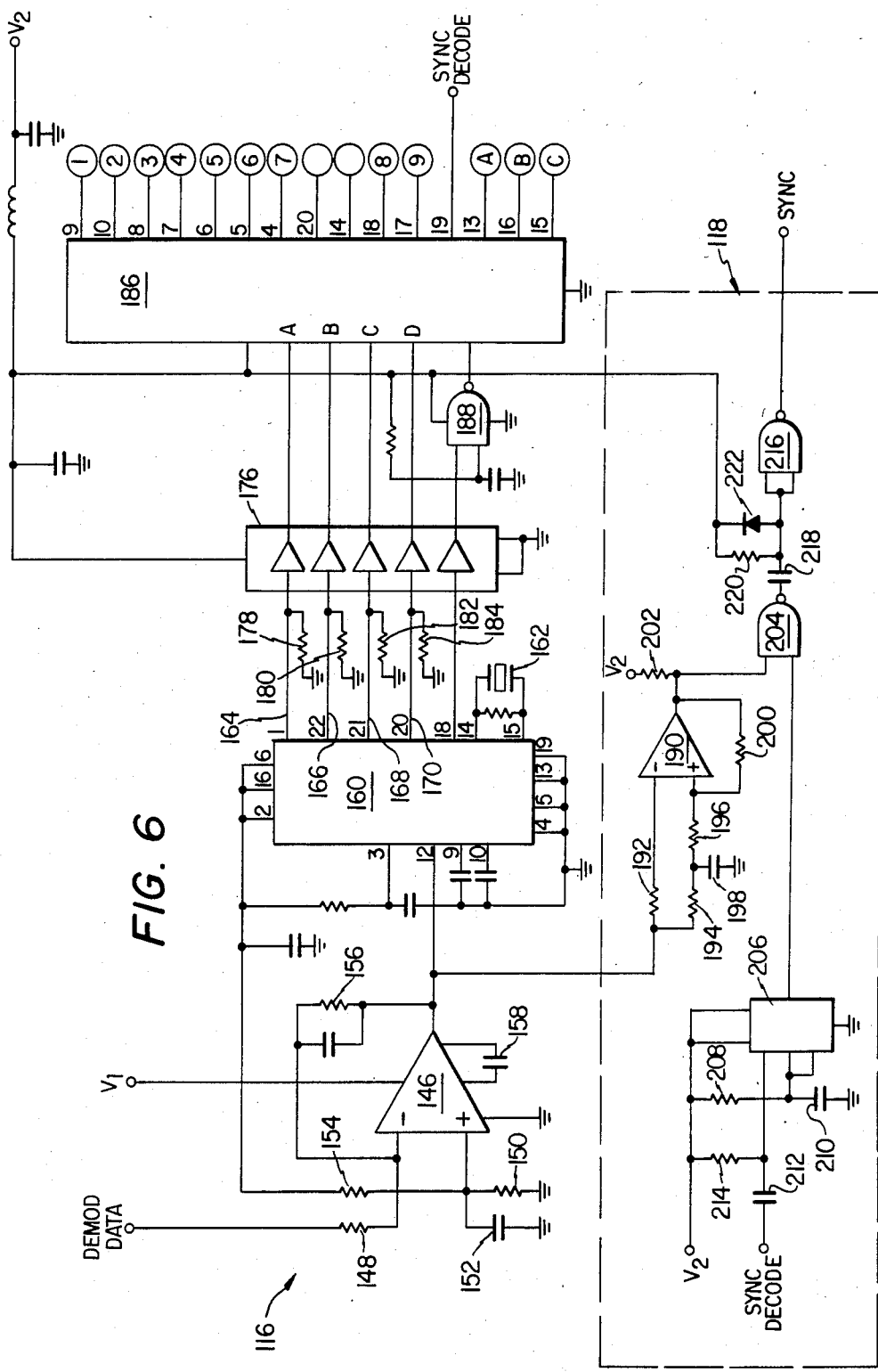
FIG. 6 illustrates a schematic diagram of the receiving portion of the transceiver.

Referring now to FIG. 6, there is illustrated a schematic diagram of the DTMF decoder 116 and the reset decoder 118. The reset decoder 118 is shown within the phantom lines. The output of the demodulator 114 of the receiver 80 is termed DEMOD DATA. The DEMOD DATA is input to an operational amplifier 146 through a series connected resistor 148. The positive input of the amplifier 146 is connected to ground through a resistor 150. Hereinafter, grounds are referred to a reference level and shall be illustrated by the conventional symbol therefor. A capacitor 152 is connected in parallel to the resistor 150. The power supply terminal of the amplifier 146 is connected to a voltage $V_1$ and the negative voltage input thereof is connected to ground. A resistor 154 has one end thereof connected to the positive input of the amplifier 146 and the other end thereof connected to $V_1$. A resistor 156 has one end thereof connected to the output of the amplifier 146 and the other end thereof connected to the negative input of the amplifier 146. A compensation capacitor 158 is connected to the compensation inputs of the amplifier 146. The amplifier 146 is configured as an inverting amplifier for providing some amplification of the demodulated signal and acting as a buffer therefor.

The output of the amplifier 146 is input to a DTMF converter 160. The DTMF converter converts the DTMF signals that were demodulated from the received carrier into digital signals on the output thereof. A crystal 162 is provided for a time base reference thereof. The components attached to the DTMF converter 160 and the connection therefore are described in Silicon Systems SSI 201 data sheet. The DTMF converter 160 has four digital outputs 164, 166, 168 and 170 which correspond to the digital bits A, B, C and D of a four-bit digital word, A being the least significant bit. The outputs 164-170 are connected to individual inputs of a hex level converter 176 for converting the input level to an appropriate logic level on the output thereof. The hex converter 176 has the reference input thereof connected to ground and the supply input thereof connected to a level $V_2$. The logic level on the output of the hex converter 176 is set to the level $V_2$. Pull down resistors 178, 180, 182 and 184 are connected to the outputs 164-170, respectively.

The converted levels of the lines 164-170 are input to the A, B, C and D inputs, respectively, of a 4-16 line decoder 186. The 4-16 decoder is operable to decode the four-bit digital word on the input thereof to activate one of 16 outputs therefrom. In this manner, the DTMF signal that was transmitted to the receiver 80, can carry up to 16 separate bits of information that activate a selected one of the outputs of the decoder 186. A NAND gate 188, the input of which is connected to an output of the DTMF converter 160 through one of the level converters on the hex converter 176, has the output thereof connected to the inhibit input of the decoder 186. This inhibit input outputs a "high" logic state on all of the outputs of the 4-16 decoder 186 when activated.

The output of the amplifier 146 having the buffer demodulated signal thereon is connected to the negative input of an operational amplifier 190 through a resistor 192 and to the positive input thereof through two resistors 194 and 196 connected in series. A capacitor 198 has one end thereof connected to the common connection between the resistors 194 and 196 and the other end thereof connected to ground. A feedback resistor 200 is connected between the output of the operational amplifier 190 and the positive input thereof. The amplifier 190 and the associated components therefor is operable to provide a squaring function to shape the input signal therefor. A pull-up resistor 202 has one end thereof connected to the output of the amplifier 190 and the other end thereof connected to $V_2$ or $V_3$ to provide a current source therefore.

A NAND gate 204 has one input thereof connected to the output of the amplifier 190 and the other input thereof connected to the output of a timer 206. A timing resistor 208 is provided with one end thereof connected to the timing input of the timer 206 and the other end thereof connected to $V_2$ or $V_3$. A timing capacitor 210 has one end thereof connected to the timing input of the timer 206 and the other end thereof connected to ground. The resistor 208 and the capacitor 210 are operable to provide a timing function for the timer 206 which, in the configuration illustrated, is configured as a one-shot circuit. The trigger input of the timer 206 is connected through a capacitor 212 to one of the outputs of the 4-16 decoder 186. A resistor 214 has one end thereof connected to the trigger input and the other end thereof connected to $V_2$ or $V_3$. The capacitor 212 and the resitor 214 function to differentiate the output of the 4-16 decoder 186 to provide a trigger pulse. The output selected from the decoder 186 is labeled SYNC DECODE. In the preferred embodiment, the interval of the pulse output by the timer 206 is approximately 300 millisec. The output of the NAND gate 204 is connected to both inputs of a NAND gate 216 through a capacitor 218. A resistor 220 has one end thereof connected to the input of the NAND gate 216 and the other end thereof connected to $V_2$. A diode 222 has the anode thereof connected to the input of the NAND gate 216 and the cathode thereof connected to $V_2$. The capacitor 218, the resistor 220 and the diode 222 function as a pulse converter that converts the transitions on the output of the NAND gate 204 to a series of narrow width pulses that occur for each transition and are inverted by the NAND gate 216. Therefore, a sine wave that is input to the amplifier 190 results in a plurality of narrow pulses output by the NAND gate 216. These pulses are referred to as the SYNC signal.

During the receive mode of the DAU 14, power is supplied such that the voltage reference $V_1$, $V_2$ and $V_3$ are supplied to the circuit. The DTMF converter 160 receives the DTMF signals and derives the coded four-bit word therefrom. This four-bit word contains information that is input to the logic control circuit 88 on the DAU 14 through activation of the outputs of the decoder 186. Prior to the transmission of data, it is necessary to program all of the DAU's 14. Initially, each of the DAU's 14 is in a standby mode and must be instructed to energize the decoder and logic circuits thereof. After the DAU 14 has received the signal to ready itself for further data, the time that the DAU is to collect and transmit data is then sent to the DAU 14 in the form of a sequence of DTMF codes and CLEAR codes. Prior to transmission of data, it is necessary to synchronize all of the DAU's 14, as will be described hereinbelow. After synchronization, signals are sent to the DAU's 14 to indicate the mode of operation, either STATUS or DATA, that the DAU is to be in.

UNIT SYNCHRONIZATION

To synchronize the DAU 14, a DTMF signal is sent to the receiver 80 that is decoded and input to the timer 206. Once the timer 206 has been initiated, it opens the gate 204. A tone is then transmitted by the command station 10 and is input to the amplifier 190 for shaping thereof. This tone, in the preferred embodiment, has a frequency of 250 Hz, 500 Hz, or 1 KHz. As described above, this tone is converted into a series of narrow pulses having a frequency equal to the tone input to the amplifier 190.

Figure 7:
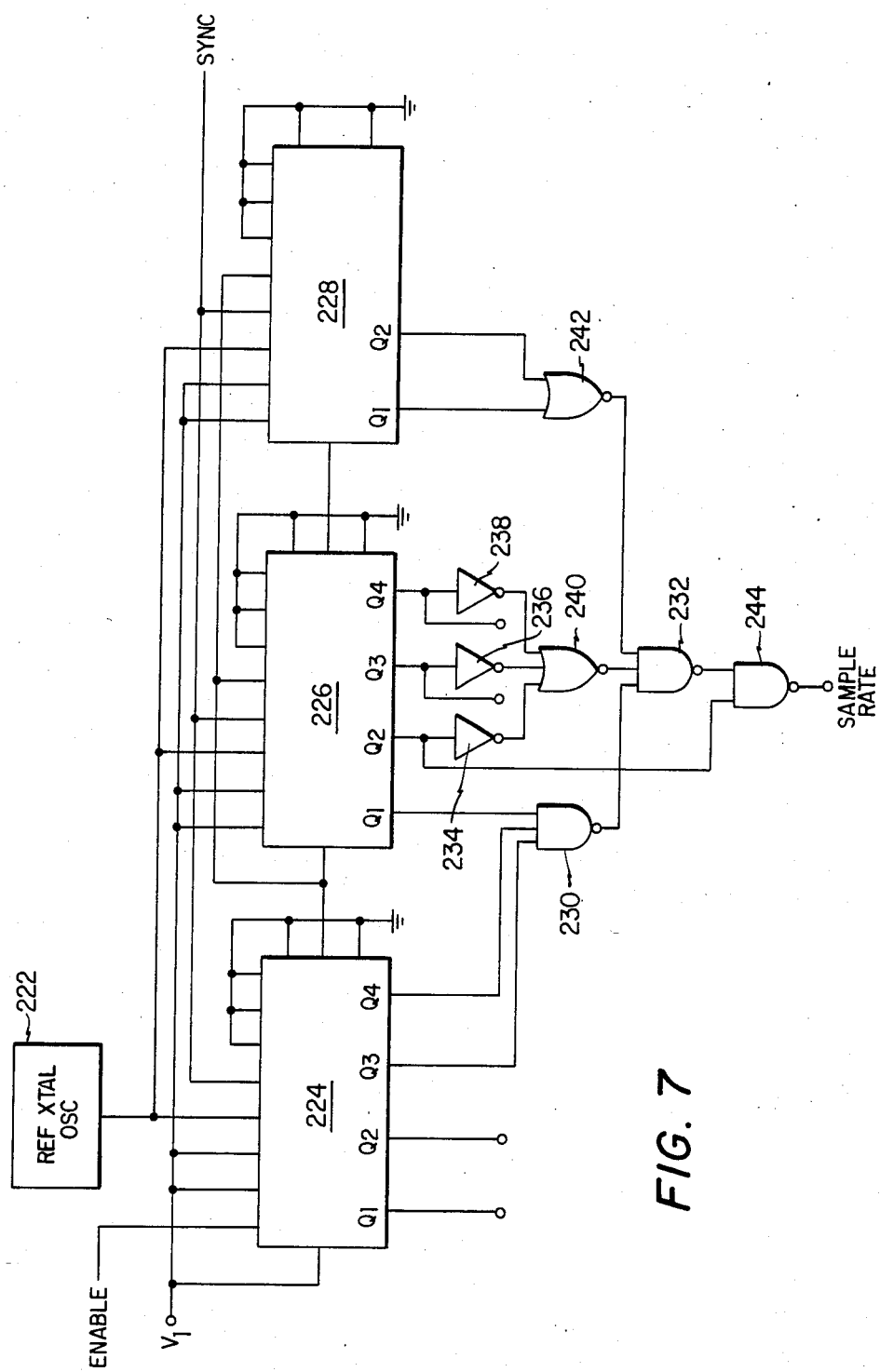
FIG. 7 illustrates a schematic diagram of the logic circuit for achieving unit synchronization.

Referring now to FIG. 7, there is illustrated a schematic diagram of the clock generation circuit that receives the SYNC signal from the reset decoder circuit 118. Each of the DAU's 14 has a system clock that is disposed on the logic control circuit 88. This reference oscillator has a crystal reference that is common to all of the DAU's 14. This crystal reference is utilized to generate a relatively high frequency clock; in the preferred embodiment, this frequency is around 2.3 MHz which is divided down to provide an intermediate frequency. This oscillator is indicated by the reference oscillator 222 in FIG. 7. The output of the reference oscillator 222 is input to the clock inputs of three programmable four-bit counters 224, 226 and 228. The Carry Out of the counter 224 is connected to the Enable inputs of the counter 226 and the Carry Out of the counter 226 is input to the Enable input of the counter 228. Therefore, the counters 224, 226 and 228 are connected in series such that there is provided a 12-bit synchronous counter, of which only ten bits are utilized. Each of the counters 224-228 has four outputs labeled Q1 to Q4 for the four bits output therefrom and the least significant bit is the Q1 output of counter 224.

Each of the outputs of the counters 224–228 are input to inverters to provide the inverse output thereof.

The Q3 and Q4 outputs of the counter 224 are connected to two inputs of a three input NAND gate 230. The other input of the NAND gate 230 is connected to the Q1 output of counter 226. The output of NAND gate 230 is input to one input of a three input NAND gate 232. The Q2, Q3 and Q4 outputs of counter 226 are inverted by inverters 234, 236 and 238, respectively, and input to the three inputs of a three input NOR gate 240. The output of the NOR gate 240 is input to one input of the NAND gate 232. The Q1 and Q2 outputs of the counter 228 are input to both inputs of a NOR gate 242, the output of which is input to the third input of the NAND gate 232. The output of the NAND gate 232 is input to one input of a NAND gate 244, the other input of which is connected to the Q2 output of counter 226. The output of the NAND gate 244 provides the sample rate at which the data is sampled by the A/D converter on the logic board, (not shown).

The SYNC signal is input to the reset inputs of the counters 224, 226 and 228. As described above, the SYNC signal is a plurality of reset pulses that have a frequency equal to the tone transmitted by the command unit. The frequency of this tone corresponds to the sample rate output by the NAND gate 244. When a pulse is present on the CLEAR input of the counters 224–228, all the outputs will be at a logic "low". After the pulse is removed, the output of the reference oscillator 222 will clock the counters 224–228 through their sequence. The reset pulses are not synchronized with the reference oscillator 222 and, therefore, they can occur at any phase of the reference oscillator 222. It is the trailing edge of the pulses that allows the counters 224–228 to begin counting. However, they do not begin counting until they receive a transition from the reference oscillator 222. Therefore, all of the counters 224–228 in all of the DAU's 14 will begin counting upon the next transition of their internal reference clocks. This will constitute the total error for all of the DAU's 14 at initiation of the counters 224–228. However, after the reset pulses are removed, all of the counters drift as a function of the drift in the oscillators 222. In the preferred embodiment, the internal crystal reference of 2.3 MHz is divided down to approximately 576 KHz. One period of the 576 KHz clock will therefor be the maximum error for the initial count between all counters on all DAU's 14.

Since the reset pulses have a frequency equal to the sample rate output by NAND gate 244, the count will always initiate a defined number of clock periods after each reset pulse on the CLEAR input. Therefore, if a particular DAU 14 misses one of the reset pulses due to poor reception, the maximum error between this DAU 14 and other DAU's 14 is the drift of its internal reference oscillator 222 for one period (or the number of periods missed) of the sample rate.

Modulation OF DAU

Figure 8:
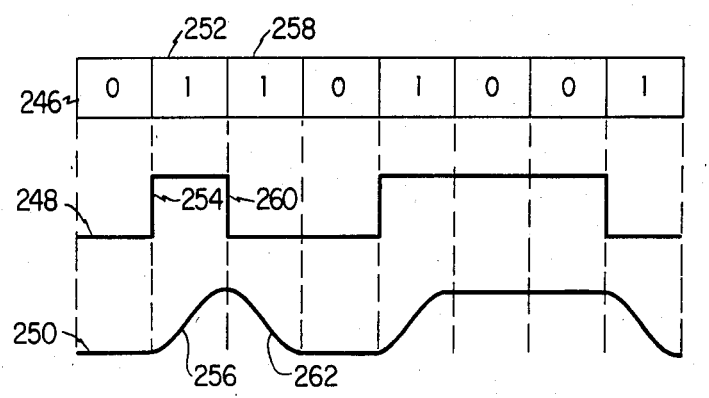
FIG. 8 illustrates the modulation waveform for modulation of the carrier.
Figure 10:
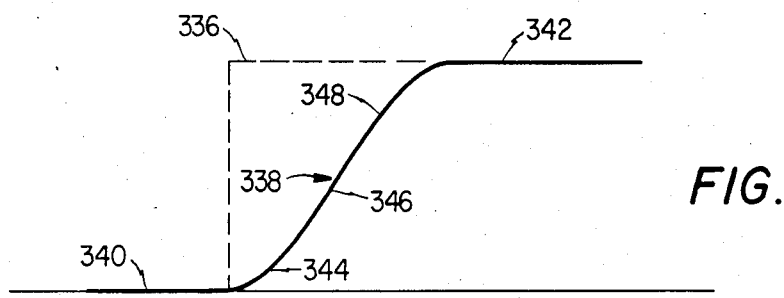
FIG. 10 illustrates an expanded view of the modulation waveform for one bit of data.

Referring now to FIGS. 8 and 10, there are illustrated the waveforms representative of the modulation technique used in the transmitter 78 in each of the DAU's 14. A waveform 246 represents a portion of a digital word that is to be transmitted over the data link. A "low" logic state is represented by a "0" and a "high" logic state is represented by a "1". These logic states occur at a given bit rate which is the frequency at which the individual bits of logic information are transmitted. One "bit time" is equal to the duration of a particular bit. A waveform 248 represents the format in which the digital data is encoded. In the preferred embodiment, this format is a non-return to zero (NRZ) format. The occurrence of a logic "1" results in a transition in the NRZ data from either a logic low to a logic high or a logic high to a logic low. For example, a continuous string of logic "1"'s would result in a continuous string of transitions between the successive bits of data. However, a logic "1" followed by a logic "0" would result in no transition and a string of logic "0"'s would result in no transitions either. The data represented by the waveform 248 is the PCM data that is input to the modulation driver 140 on the transmitter 78 and the output of the modulation driver 140 that is input to the summing junction 128 is represented by a waveform 250. Since the transmission of a sharp transition would require a fairly wide bandwidth and such a signal would be very harmonic rich, it is necessary to filter the signal to minimize the required bandwidth without losing the digital information. With the NRZ format, it is only necessary to detect that a transition has occurred within a given bit time. Therefore, the signal in the waveform 248 is filtered by the modulation driver 140 such that the transition between two logic states is very "soft", that is, the signal requires the entire duration of a particular bit to make the transition. This minimizes the rate of change of the transition for that duration. For example, the occurrence of a digital bit 252, which is a logic "1", results in a transition 254 from a logic low to a logic high state in the waveform 248. This transition is filtered by the modulation driver 140 and is represented by a filter transition 256 on the waveform 250. The occurrence of another digital bit 258 results in the opposite transition 260 on the waveform 248 from a logic high to a logic low state. This results in a filtered transition 262 on the waveform 250. As illustrated in the waveform 250, both the filtered transitions 256 and 262 require one entire bit time to vary between two opposing logic levels.

Figure 9:
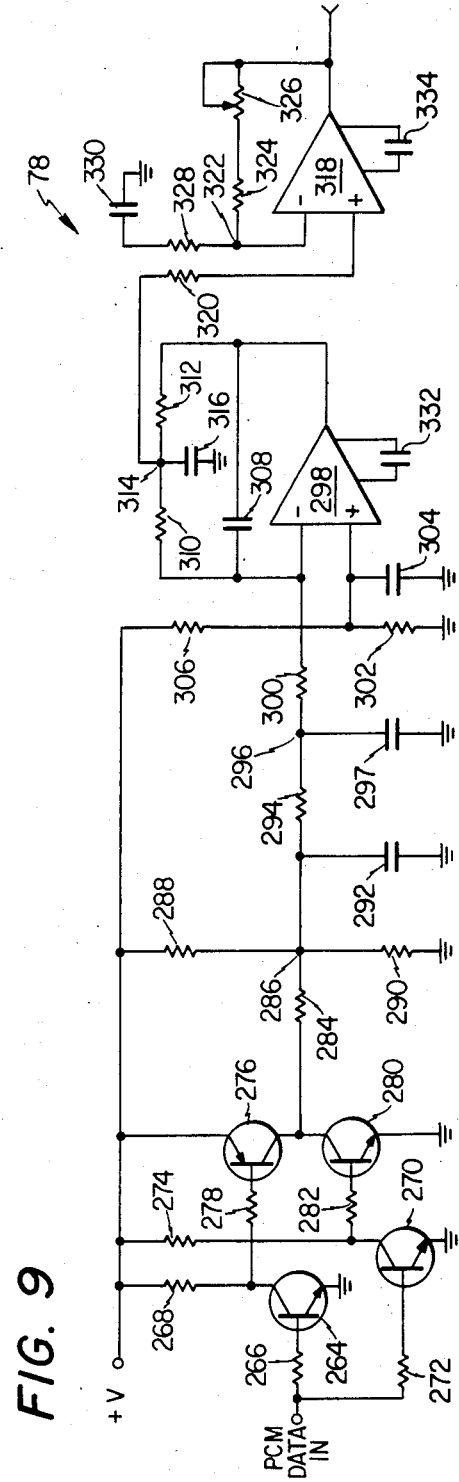
FIG. 9 illustrates a schematic diagram of the modulation driver for the transmitter portion of the transceiver.

Referring further to FIG. 9, there is illustrated a schematic diagram of a modulation driver 140. The PCM data is input to the base of an NPN transistor 264 through a series connected resistor 266. The transistor 264 has the emitter thereof connected to ground and the collector thereof connected to +V through a series resistor 268. The PCM data is also input to the base of an NPN transistor 270 through a series resistor 272. The transistor 270 has the emitter thereof connected to ground and the collector thereof connected to +V through a resistor 274. The transistor 264 has the collector thereof connected to the base of a PNP transistor 276 through a series resistor 278 and the transistor 270 has the collector thereof connected to the base of an NPN transistor 280 through a series resistor 282. The transistor 280 has the emitter thereof connected to ground and the collector thereof connected to the collector of the transistor 276. The transistor 276 has the emitter thereof connected to +V. The transistors 264, 270, 276 and 280 with their associated resistors form a level converter that converts the PCM data signal level to the higher level of +V. In the preferred embodiment, the PCM data has a level of 5 VDC and the converted level has a peak to peak level of 10 VDC.

The collector of the transistor 280 is connected to one end of a resistor 284, the other end of which is connected to a node 286. A resistor 288 has one end thereof connected to the node 286 and the other end thereof connected to +V. Resistor 290 has one end thereof connected to ground and the other end thereof connected to the node 286. A capacitor 292 has one end thereof connected to ground and the other end thereof connected to the node 286. A resistor 294 has one end thereof connected to the node 286 and the other end thereof connected to a node 296. A capacitor 297 has one end thereof connected to ground and the other end thereof connected to the node 296. The resistors 284, 288 and 290 and the capacitor 292 form one section of the filter and the resistor 294 and the capacitor 297 form another section of a filter. The combined sections of the filter form a low pass function that filters the leading edge of each of the transitions for the PCM data.

The output of the filter sections at the node 296 is connected to the negative input of an operational amplifier 298 through a resistor 300. A resistor 302 and a capacitor 304 have one of the ends thereof connected to the positive input of the amplifier 298 and the other end thereof connected to ground. A resistor 306 has one end thereof connected to the positive input of the amplifier 298 and the other end thereof connected to +V. A feedback capacitor 308 has one end thereof connected to the negative input of the amplifier 298 and the other end thereof connected to the output of the amplifier 298. A resistor 310 and a resistor 312 have one of the ends thereof connected to a node 314. The other end of the resistor 310 is connected to the negative input of the amplifier 298 and the other end of the resistor 312 is connected to the output of the amplifier 298. A capacitor 316 has one end thereof connected to the node 314 and the other end thereof connected to ground. The node 314 is connected to the positive input of an operational amplifier 318 through a resistor 320. The negative input of the amplifier 318 is connected to a node 322. A resistor 324 has one end thereof connected to the node 322 and the other end thereof connected to one end of a variable resistor 326. The other end of the variable resistor 326 is connected to the output of the amplifier 318. A resistor 328 has one end thereof connected to the node 322 and the other end thereof connected to one end of a capacitor 330. The other end of the capacitor 330 is connected to ground. The amplifier 298 and the amplifier 318 have compensation capacitors 332 and 334, respectively, connected to the compensation inputs thereof.

The amplifier 298 and the capacitor 308 form an integrator for integrating the output signal of the two section filter at node 296. The resistor 312 and the capacitor 316 form a one section low pass filter to filter the output of the integrator. This one section filter essentially delays the signal. The resistor 310 feeds back a portion of output signal for summation at the input of the amplifier 298. Basically, the two section filter "rolls off" the end of the transition and the integrator in combination with the one section filter rolls off the initial portion of the transition.

Referring now to FIG. 10, there is illustrated a waveform representative of one transition of the waveform 248 of FIG. 8. A waveform 336 (phantom outline) illustrates the original transition and a waveform 338 illustrates the filtered waveform. The filtered waveform 338 is comprised of three transitions. Since it is necessary to make a transition from a low logic level 340 to a high logic level 342, it is necessary to undergo a rate of change for the waveform, that is, the derivative thereof must increase to a maximum rate of change and then decrease to a value of zero. For a step function, as shown in the waveform 336, the derivative would be essentially infinite for a short duration of time. It is this high rate of change that requires the very large bandwidths to reconstruct the data at the receiver. The waveform 338 reduces the required bandwidth by forming a first portion 344 that undergoes an increasing rate of change until a constant rate of change is achieved at the point 346. This is a constant rate of change for the waveform 338 which is maximum at that point and begins decreasing over a portion of the waveform 338. To achieve the minimum bandwidth for a given transition, the waveform 338 must have a rate of change that approaches that of a sine wave. Since a sine wave has only one fundamental frequency, the bandwidth required for transmission thereof is minimal depending upon the frequency.

The circuit of FIG. 9 realizes the waveform 338. The input pulse is filtered by the two filter sections preceding the node 296 such that the leading edge is "rolled off", that is, the portion of the waveform 348 is formed with an evenly decreasing rate of change. However, the leading edge still undergoes a very rapid rate of change prior to integration thereof. This portion of the curve is integrated by the amplifier 298 and the associated circuitry. The integration function decreases the overall rate of change for the transition. However, the rate of change at the initiation of integration is relatively high since the signal level changes from a constant level to sloping curve very abruptly. This abrupt change results in very high harmonics. To alleviate this, the one section filter and the feedback resistor 310 operate to put a delay in the circuit. This delay causes the initial portion 344 of the waveform 338 to change at a slower rate, i.e., that of a sine wave. By selecting the values properly, the curve of FIG. 10 can be realized. The values for the circuit of FIG. 9 for a bit width of 110 microseconds are included in Table 1 as follows:

| Resistor | Value (ohms) | Capacitor | Value |
| --- | --- | --- | --- |
| 284,288,290 | 39K | 292 | 4700 pf |
| 294 | 51K | 298 | 4700 pf |
| 300 | 13K | 308 | 470 pf |
| 302,306 | 27K | 316 | 2200 pf |
| 320,328 | 390K | 304 | .022 |
| 324 | 270K | 330 | 1 |
| 326 | 500K | 332,334 | 12 pf |

PCM RECEIVER

Figure 11:
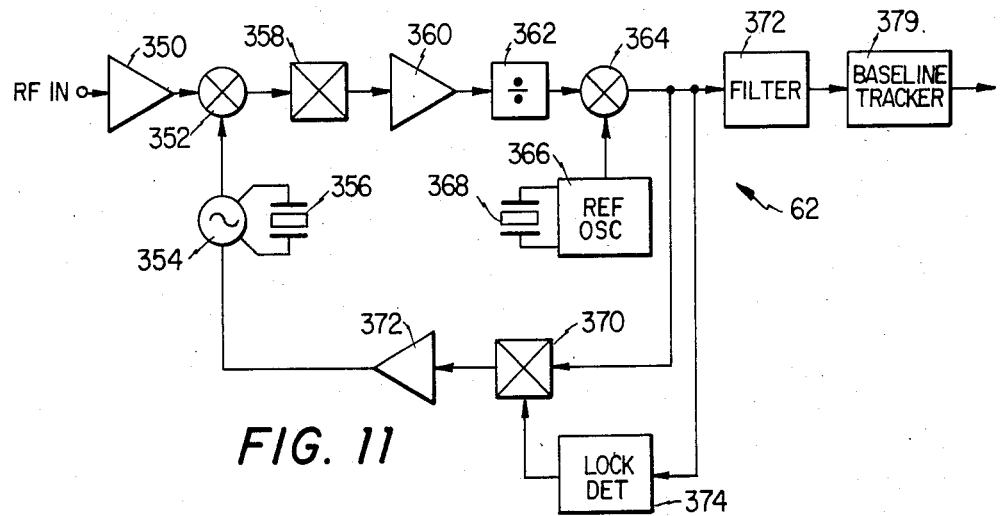
FIG. 11 illustrates a block diagram of the PCM receiver of the command unit.

Referring now to FIG. 11, there is illustrated a block diagram of the PCM receiver 62 in the command station 10. As described above, the PCM receiver 62 receives the modulated RF carrier and demodulates the carrier to retrieve the NRZ data. The RF data is input to the input of an RF amplifier 350 for amplification and the amplified output thereof is input to the RF input of a mixer 352. A local oscillator 354 has the output thereof connected to the local oscillator input of the mixer 352. The local oscillator 354 is a voltage controlled crystal oscillator (VCXO) having a crystal 356 attached thereto to provide the reference therefor. The output of the mixer 352 is input to an IF filter 358 having a frequency of 10.7 MHz. The output of this filter is input to an IF amplifier 360 for amplification thereof. The output thereof is input to a divider circuit 362 to divide the output thereof by a factor of approximately 8. The divided output is input to one input of a phase detector 364 and the output of a crystal reference oscillator 366 is connected to the other input of the phase detector 364. The reference oscillator 366 has a crystal 368 attached thereto to provide a stabilized reference therefor. The output of the phase detector 364 is input to a variable loop filter 370, the output of which is input to a loop amplifier 372. The output of the loop amplifier 372 provides the phase error voltage for the local oscillator 354. The phase detector 364, reference oscillator 366, loop filter 370 and local oscillator 354 form a phase lock loop (PLL) for locking to the received signal. Normally, phase lock loops have a particular frequency range over which they can capture a particular frequency and a certain range of phase error that they can lock to. Since, as described above, there are a plurality of PCM receivers 62 operating on discrete channels, it is necessary that the frequency capture range of the PLL be minimized such that it does not lock to an adjacent channel. This is achieved by utilizing a VCXO for the local oscillator 354 that will not lock over a large range of frequencies.

To adequately demodulate the PCM data modulated on the RF carrier, it is necessary to provide a transfer function for the loop filter 370 that will adequately demodulate the data. However, one of the disadvantages to having a sufficient loop filter is that the "lock time" for the PLL is substantially decreased. This is a disadvantage when the loop goes out of lock due to noise pulses or upon initiating lock. To alleviate this, the loop filter 370 has a second mode in which the lock time is increased. This is achieved by detecting lock with a lock detector 374 having the input thereof connected to the output of the phase detector 364 and the output thereof connected to a control input for the loop filter 370. Lock is determined by the relative phase error with respect to the phase of the local oscillator 354. When the phase error between the IF signal and the reference oscillator 366 exceeds a predetermined value, the lock detector outputs a signal to change the lock time of the PLL. This allows lock to occur at a faster rate, thereby reducing loss of data. If this lock time were not increased, it is possible that a number of bits of the data would be lost.

The output of the phase detector 364 is input to a filter 377 and then the demodulated data is input to a base line tracker 379 to remove low frequency components therefrom. This base line tracker is necessary since the logic state of the data received is determined by sensing a transition from a low logic level to a high logic level. This is accomplished by measuring the signal level with respect to a reference. If low frequency components exist, this introduces substantial error.

Figure 12:
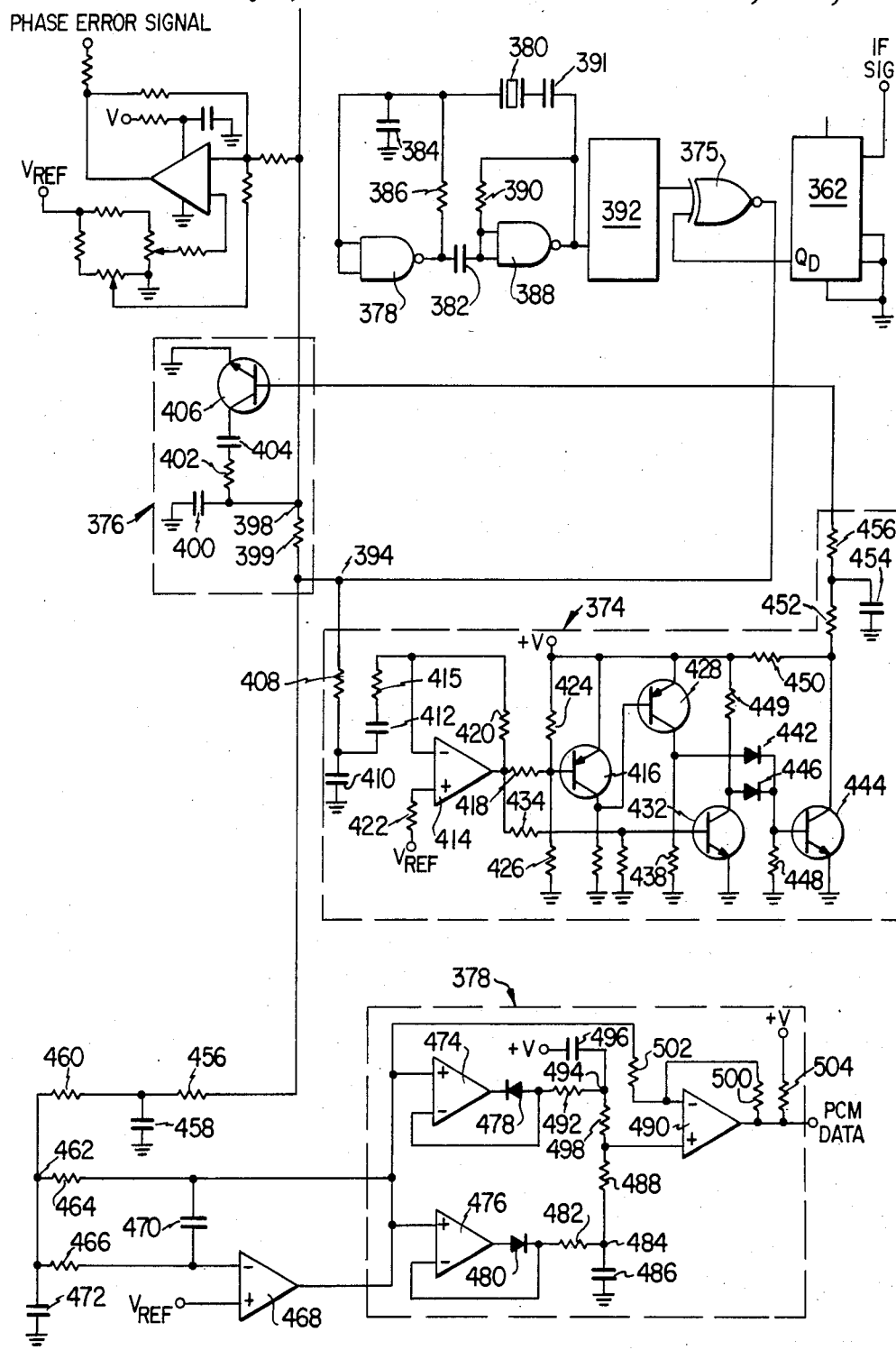
FIG. 12 illustrates a schematic diagram of the PCM receiver.

Referring now to FIG. 12, there is illustrated a schematic diagram of the portion of the PCM receiver 62 for processing the IF signal output by the IF amp 360 to provide the phase error signal for the local oscillator 354. The schematic of FIG. 11 also includes the schematic for the demodulator 377 and the base line corrector 379. The output of the IF amplifier 360 in FIG. 11 is input into the divider 362. The output signal from the amplifier 360 is designated IF SIG. The divider 362 is a four-bit binary counter which divides the IF SIG by a factor of 8. The IF SIG is input to the reset input thereof and the output taken from the $Q_D$ output thereof. The output is input to one input of an Exclusive NOR gate 375.

A NAND gate 378 has both inputs thereof connected to one side of a crystal 380 and the output thereof connected to one side of a capacitor 382. A capacitor 384 is connected between the input of the NAND gate 378 and ground. The other end of the capacitor 382 is connected to both inputs of a NAND gate 388. A resistor 390 has one end thereof connected to the input of the gate 388 and the other end thereof connected to the output of the gate 388. A capacitor 391 has one end thereof connected to the output of the gate 388 and the other end thereof connected to the other end of the crystal 380. The gates 378 and 388 and the crystal 380 comprise a reference oscillator for providing a reference signal. This reference signal is input to a divider 392 that divides the signal by a factor of 2 for input to the other input of the Exclusive NOR gate 375. The output of the divider has a frequency of approximately 1.35 MHz and the Exclusive NOR gate 375 compares the phase of the signal to the phase of the IF SIG that was divided by a factor of 8 by the divider 362. The output of the Exclusive NOR gate 375 is the phase detected signal and this signal is input to a node 394. The loop filter 370 has the input thereof connected to the node 394 for providing the PLL loop response.

The loop filter 370 has a resistor 399 with one end thereof connected to the node 394 and the other end thereof connected to a node 398. The resistor 399 and the capacitor 400 provide the secondary or fast loop filtering for the loop. This portion of the loop filter 70 provides a loop response that obtains lock during initial lock up. This fast loop is necessary when large phase errors exist in order to acquire lock at a faster rate. The primary or slow loop response that is utilized to demodulate the data is accomplished by placing a series connected resistor 402 and capacitor 404 having one end thereof connected to the node 398 and the other end thereof connected to the collector of an NPN transistor 406. The emitter of the transistor 406 is connected to ground and the base thereof is connected to the output of the lock detector 374. When the series resistor capacitors 402 and 404, respectively, are connected to ground through transistor 406, the loop response of the PLL is altered such that the rate of lock acquisition is decreased. The point at which this transistor 406 is activated is determined by the lock detector 374 which has its input thereof connected to the node 394.

A lock detector 374 has a resistor 408 and capacitor 410 connected as an L section filter with the other end of the capacitor connected to ground. A series capacitor 412 has one end thereof connected to the output of the L-section filter and the other end thereof connected to the input of an operational amplifier 414 through a series resistor 415. The output of the amplifier 414 is connected to the base of a PNP transistor 416 through a series resistor 418. A feedback resistor 420 is connected between the negative input of the amplifier 414 in the output thereof. A reference voltage is connected to the positive input of the amplifier 414 through a series resistor 422. The base of the transistor 416 is biased to a predetermined level by a voltage divider formed of two resistors 424 and 426 of which 424 has one end thereof connected to +V and the resistor 426 having one end thereof connected to ground. The transistor 416 has the emitter thereof connected to +V and the collector thereof connected to the base of a PNP transistor 428. The transistor 428 has the emitter thereof connected to +V and the collector thereof connected through a resistor 430 to ground. The output of the amplifier 414 is connected to the base of a PNP transistor 432 through a series resistor 434 with a resistor 436 having one end thereof connected to the base of the transistor 432 and the other end thereof connected to ground. The collector of the transistor 432 is connected to +V through a resistor 440. A diode 442 has the anode thereof connected to the collector of the transistor 428 and the cathode thereof connected to the base of an NPN transistor 444. A diode 446 has the anode thereof connected to the collector of the transistor 432 and the cathode thereof connected to the base of the transistor 444. A resistor 448 has one end thereof connected to the base of the transistor 444 and the other end thereof connected to ground. The collector of the transistor 444 is connected to +V through a resistor 450. A resistor 452 and a capacitor 454 are connected as an L-section filter with the capacitor 454 thereof having one end connected to ground and a resistor 452 having one end thereof connected to the collector of the transistor 444. A series resistor 456 has one end thereof connected to the output of the L-section filter and the other end thereof connected to the input of the transistor 406 on the loop filter 370. The transistor 444 is the output transistor for the phase lock detector 374.

The lock detector 374 is operable to control the loop filter 370 when the phase error out of the phase detector 364 exceeds a value that is higher or lower than a predetermined value. These predetermined values are set by voltage dividers. One direction of the error is controlled by the PNP transistors 416 and 428 which are normally biased on by the resistors 424 and 426. When these transistors are biased on, the diode 442 conducts current to the resistor 448, thus biasing the transistor 444 into a conducting state. This results in a low voltage input to the base of the transistor 406 thereby preventing conduction therein. When the voltage output by the amplifier 414 increases due to an increase in the phase error, the current through the resistor 426 increases thereby cutting off the transistor 416, resulting in transistor 428 going into cut off. This eliminates current supplied through the resistor 448 from the diode 442. This increase in voltage on the output of the amplifier 414 also increases the voltage on the base of the transistor 432 thereby placing the anode of the diode 446 at a ground potential and reducing any current contribution to the resistor 448 therefrom. Therefore, an increase in phase error voltage that raises the output of the voltage of the amplifier 414 turns off the transistor 406 in the loop filter 370. When the voltage in the output of the amplifier 414 drops, the transistor 406 begins to conduct and place the resistor 402 and capacitor 404 in the loop filter circuit.

The signal on the node 394 when the loop has acquired lock comprises the PCM data. A resistor 456 has one end thereof connected to the node 394 and the other end thereof connected to one end of a capacitor 458, the other end of which is connected to ground. A resistor 460 has one end thereof connected to the junction of the resistor 456 and the capacitor 458 and the other end thereof connected to a node 462. A resistor 466 has one end thereof connected to the node 462 and the other end thereof connected to the negative input of the amplifier 468. A capacitor 470 has one end thereof connected to the negative input of the amplifier 468 and the other end thereof connected to the output of the amplifier 468. A capacitor 472 has one end thereof connected to the node 462 and the other end thereof connected to ground. The positive input of the amplifier 468 is connected to a voltage reference which, although not shown, is variable. The amplifier 468 is configured as a low pass active filter, the output of which varies about a DC reference voltage.

Base Line Tracker

The output of the amplifier 468 is input to the base line tracker 379. Base line tracker 379 is comprised of an operational amplifier 474 and an operational amplifier 476 configured as peak detectors. The amplifier 474 has the output thereof connected to the cathode of a diode 478 and the negative input thereof connected to the anode of the diode 478. The amplifier 476 has the output thereof connected to the anode of a diode 480 and the negative input thereof connected to the cathode of the diode 480. The amplifier 474 is configured as a negative peak detector and the amplifier 476 is configured as a positive peak detector. A resistor 482 has one end thereof connected to the cathode of the diode 480 and the other end thereof connected to a node 484. A capacitor 486 has one end thereof connected to the node 484 and the other end thereof connected to ground. A resistor 488 has one end thereof connected to the node 484 and the other end thereof connected to the positive input of a comparator 490. A resistor 492 has one end thereof connected to the anode of the diode 478 and the other end thereof connected to a node 494. A capacitor 496 has one end thereof connected to the node 494 and the other end thereof connected to +V. A resistor 498 has one end thereof connected to the node 494 and the other end thereof connected to the positive input of the comparator 490. A resistor 500 has one end thereof connected to the output of the comparator 490 and the other end thereof connected to the negative input of the comparator 490. A resistor 502 has one end thereof connected to the negative input of the comparator 490 and the other end thereof connected to the output of the amplifier 468. The positive inputs of the amplifiers 474 and 476 are also connected to the output of the amplifier 468. A pull up resistor 504 has one end thereof connected to the output of the comparator 490 and the other end thereof connected to +V to provide a current source therefor.

The PCM data, described above, is a signal that has a filtered transition between the beginning of a bit time and the end of a bit time for a given transition. The transition occurs only upon the occurrence of a logical "1". In a long bit stream, a number of logical "1"s will appear. The occurrence of these transitions will result in an AC signal that has a base line reference. The positive and negative peak detectors will detect the positive and negative peaks of the signal. For example, a positive going signal will cause a diode 80 to conduct and charge the capacitor 486 through the diode 482. Upon going negative, the diode 480 will not conduct and the charge stored on the capacitor 486 will remain relatively constant. The negative going peak causes the diode 478 to conduct thereby charging or lowering the potential on one end of the capacitor 496 that is, the value of the negative peak is stored thereon. The resistor 492 in combination with the capacitor 496 provides a time constant for charging thereof and the resistor 482 in combination with the capacitor 486 provides a time constant therefor. The voltage stored on the capacitors 486 and 496 is allowed to equilibrate through the resistors 488 and 498, the mid point is a voltage between the two capacitors input to the positive input of the comparator 490 to form a reference voltage therefor. This reference voltage represents the average value for a bit transition independent of the baseline variations. The other input to the comparator 490 is the PCM data output by the amplifier 468. The output of the comparator represents the difference between the two inputs thereof. Since the comparator 490 only detects a difference between the two inputs, low frequency components of the PCM data will be extracted from the signal since the reference signal and the positive input of the comparator 490 tracks these low frequency components. In addition, the comparator 490 only triggers on the transition of the PCM data at the average level thereof. This average level is midway between the positive and negative peaks thereof to maximize detected signal to noise. Therefore, the output signal from the comparator 490 is delayed by one-half bit time and provides a transition at the mid-point of the original PCM data bit time and it is this transition of the PCM data that is detected rather than the presence of "high" or "low" logic levels.

DIGITAL RECEIVER

Figure 13:
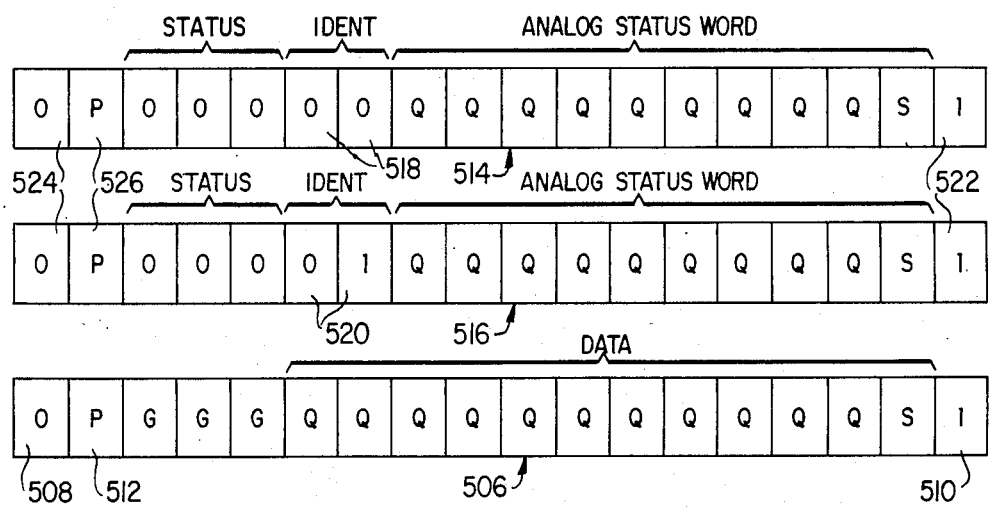
FIG. 13 illustrates the sequence of bits in both the status words and the data words that are transmitted from the remote data acquisition unit.

Referring now to FIG. 13, there is illustrated the format for the digital words that are encoded with data. Format 506 represents the data sample which is an 18-bit word having 12 bits of mantissa represented by the letter "Q" and the letter "S" for sign. The data word also has 3 bits labeled "G" which are gain bits that are utilized to determine the gain of the analog portion of the DAU 14 in order to reconstruct the data. Framing bits 508 and 510 are transmitted with predetermined values. As illustrated, the predetermined value of the framing bit 508 is "0" and the predetermined value of the framing bit 510 is "1". A parity bit 512 is also provided as representative of the parity of the data word. In addition to data words, status words are also transmitted. These status words are, as described above, indicative of the status of the DAU 14 and are transmitted in frames, that is, groups of eight status words. The first status word in each frame that is transmitted is the channel 0 status word represented by a waveform 514 and the remaining status words that are transmitted are represented by a waveform 516. Both the waveforms 514 and 516 transmit ten bits for the analog status word which are indicated by the letters "Q" for the bits of data and "S" for the sign of that data. The waveform 514 for the channel 0 status word has two identifying bits 518 and the remaining status words in the waveform 514 have two identifying bits 520. These bits are at a predetermined location within the status word and can be sampled to detect whether the word is the first word in the frame or subsequent words thereof. The channel 0 word is identified by the bits 518 and both bits are a logic "0" whereas one of the identifying bits 520 in the remaining analog status words is a logic "1". By sampling the location in these words, proper identification can be made. The status words have framing bits 522 and 524 disposed at either ends of the words and have logic states identical to that of the data word in waveform 506 and a parity bit 526. The framing bits 522 and 524 and the parity bit 526 operate similar to the framing bits and parity bit in the data word.

Referring now to FIGS. 14a-f, there is illustrated a schematic diagram of the digital receiver 66 of FIG. 2. The digital receiver 66 receives the corrected PCM data output by the base line tracker 379 of FIG. 11 and processes this data. The form of the data is an NRZ format in a continuous bit stream, that is, all the bits in each of the sequential digital words are transmitted in a stream of continuous bits. No clock signal is transmitted with the data and, therefore, the clock rate must be recovered and the digital words themselves must be synchronized. The PCM data is input to a buffer 527 which also provides level conversion. The output of the buffer 527 is input to a D-type flip flop 528 on the data input thereof. The output of the flip flop 528 is input to one input of an exclusive OR gate 530. The other input of the gate 530 is connected to the output of a D-type flip flop 532 which flip-flop also has the data input thereof connected to the output thereof. The clock inputs of the flip flops 528 and 532 are connected together to receive a clock signal. The output of the gate 530 is bi-level coded data. Therefore, the flip flops 528 and 532 and the gate 530 convert the NRZ data to bi-level coded data.

Bit Synchronization

The PCM data output by the buffer 527 is input to one input of a Schmidt trigger 534 through a series capacitor 536. The PCM data is also input to an inverter 538 and the inverted signal output therefrom is input to the other input of the Schmidt trigger 534 through a series capacitor 540. The output of the capacitor 540 is also connected to +V through a series resistor 544. The output of the Schmidt trigger 534 is input to the clock input of a D-type flip flop 552 and the output of the flip flop 552. The flip flop 552 has the $\overline{Q}$ output thereof connected to the data input thereof and the Q output thereof connected to one input of an Exclusive OR gate 554. A D-type flip flop 556 has the Q output thereof connected to the input of an inverter 558 and the $\overline{Q}$ output thereof connected to the input of an inverter 560. The output of the inverter 560 is connected to the other input of the Schmidt trigger 548 through a series capacitor 562 and the output of the inverter 558 is connected to the input of a Schmidt trigger 564 through a series capacitor 566. The other input of the Schmidt trigger 564 is connected to +V. The outputs of the capacitors 536 and 566 are connected to a positive voltage reference through pull up resistors.

The output of the Exclusive OR gate 554 is input to the negative input of an amplifier 570 through two series connected resistors 572 and 574. A capacitor 576 has one end thereof connected to the junction between the two resistors 572 and 574 and the other end thereof connected to ground. The positive input of the amplifier 570 is connected to a reference voltage $V_{ref}$ through a series resistor 578 and the output thereof is connected to the negative input thereof through a series connected resistor 580 and capacitor 582. The output of the amplifier 570 is input to one side of a varactor 584 through two series connected resistors 586 and 588. A capacitor 590 has one end thereof connected to the junction between the resistors 586 and 588 and the other end thereof connected to ground and the varactor 584 has the other end thereof connected to ground. Therefore, the bias to the varactor can be altered by the amplifier 570. The varactor is connected to one side of a crystal 592. The other side of the crystal 592 is connected to one side of a variable inductor 594, which has the other side thereof connected to the base of an NPN transistor 596. The base of the transistor 596 is connected to ground through a resistor 598. The transistor 596 has the collector thereof connected to +V through a resistor 600 and to ground through a capacitor 602, the base thereof connected to +V through a resistor 604 and to ground through two series connected capacitors 606 and 608 and the emitter thereof connected to ground through a resistor 610. The emitter is also connected to the negative input of a comparator 612 and to the junction between the two capacitors 606 and 608. The positive input of the comparator 612 is connected to one end of a resistor 614, the other end of the resistor 614 being connected to one end of a capacitor 616. The other end of the capacitor 616 is connected to ground. A resistor 618 has one end thereof connected to the other end of the resistor 614 and the other end thereof connected to the emitter of the transistor 596. The output of the comparator 612 is input to the clock input of a D-type flip flop 620, the flip flop 620 having the data input thereof connected to the Q output. The Q output of the flip flop 620 is connected to the clock input of a flip flop 622, the flip flop 622 having the data input thereof connected to the Q output thereof. The transistor 596 with the crystal 592 forms a VCXO that is divided down in frequency by the D-type flip flops 620 and 622. The fundamental frequency of the VCXO is approximately 2.31 MHz and the D-type flip flops 620 and 622 divide this frequency by a factor of approximately 4 to yield a frequency of approximately 576 KHz on the output of the flip flop 622. This frequency is input to the clock input of a counter 624. The Q2–Q4 outputs of the counter 624 are input to one input of three AND gates 626 and the output of these AND gates are input to the three inputs of a three-input NOR gate 528. The remaining input of the AND gate 626 are connected to ground through resistors 630 and three external switches through lines 632 to selectively raise the input of one of the AND gates 626 to a "high" logic level. This enables selection of the clock rate output by the counter 624. The output of the NOR gate 628 is therefor the clock frequency. The clock frequency output by the NOR gate 628 is input to the clock input of an up-counter 634, the Q2 output of which is connected to the clock input of the flip flop 556 and the Q3 output of which is connected to the D input of the flip flop 556. The Q3 output is also connected to the other input of the Exclusive OR gate 554. The Exclusive OR gate 554 is a phase detector and detects the phase difference between the input signal and the clock frequency. The output of this gate 554 drives a filter and the amplifier 570 to provide a phase error voltage for the varactor 584. It should be noted that the Schmidt trigger 534 allows for sensing both positive and negative transitions of the PCM data which is in an NRZ format. Therefore, the occurrence of all logical "1"'s is detected.

The output of the Schmidt trigger 564 is input to the reset input of the counter 634 which has a clock input thereof connected to the output of the NOR gate 628 to receive the system clock. The counter 634 provides a plurality of sequential pulses for timing purposes.

Word Synchronization

The bi-level converted data output by the Exclusive OR gate 530 is input to the data input of a static shift register 636. The static shift register 636 is connected in series to static shift registers 638 and 640 to provide an 18-bit parallel word output. The static registers 636–640 have the clock inputs thereof connected to one of the outputs of the octal counter 634 to provide the clock therefor to allow conversion of the serial bit stream to a parallel bit stream. Bit 1 output by shift register 640 is input to an inverter 642 and then to one input of an OR gate 644. The output of the OR gate 644 is the synchronizing signal $\overline{SYNC}$. Bit 18 from the shift register 636 is input to another input of the OR gate 644. An Exclusive OR gate 646 has one input thereof connected to bit 17 of shift register 636, the other input thereof connected to the output of a parity circuit 648 and the output thereof connected to the remaining input of the OR gate 644. The parity circuit 648 receives on the inputs thereof bits 2–13 to generate parity thereof. The bits 14–16 have the parity thereof generated by three Exclusive OR gates 650. Since the 15-bit data word, as described above, occupies bits 2–16, this configuration generates parity for the entire data word. The parity output, which is even or odd, is compared with the parity bit 17 in Exclusive OR 646 and a signal is output from the OR gate 644 when bits 1, 17 and 18 are at the proper logic level. As described above, bit 1 is set to be a logic "1" and bit 18 is set to a logic "0". Therefore, the output of the OR gate 644 will be a logic "low" only when bits 1, 17 and 18 are at their proper logic levels.

Figure 14A:
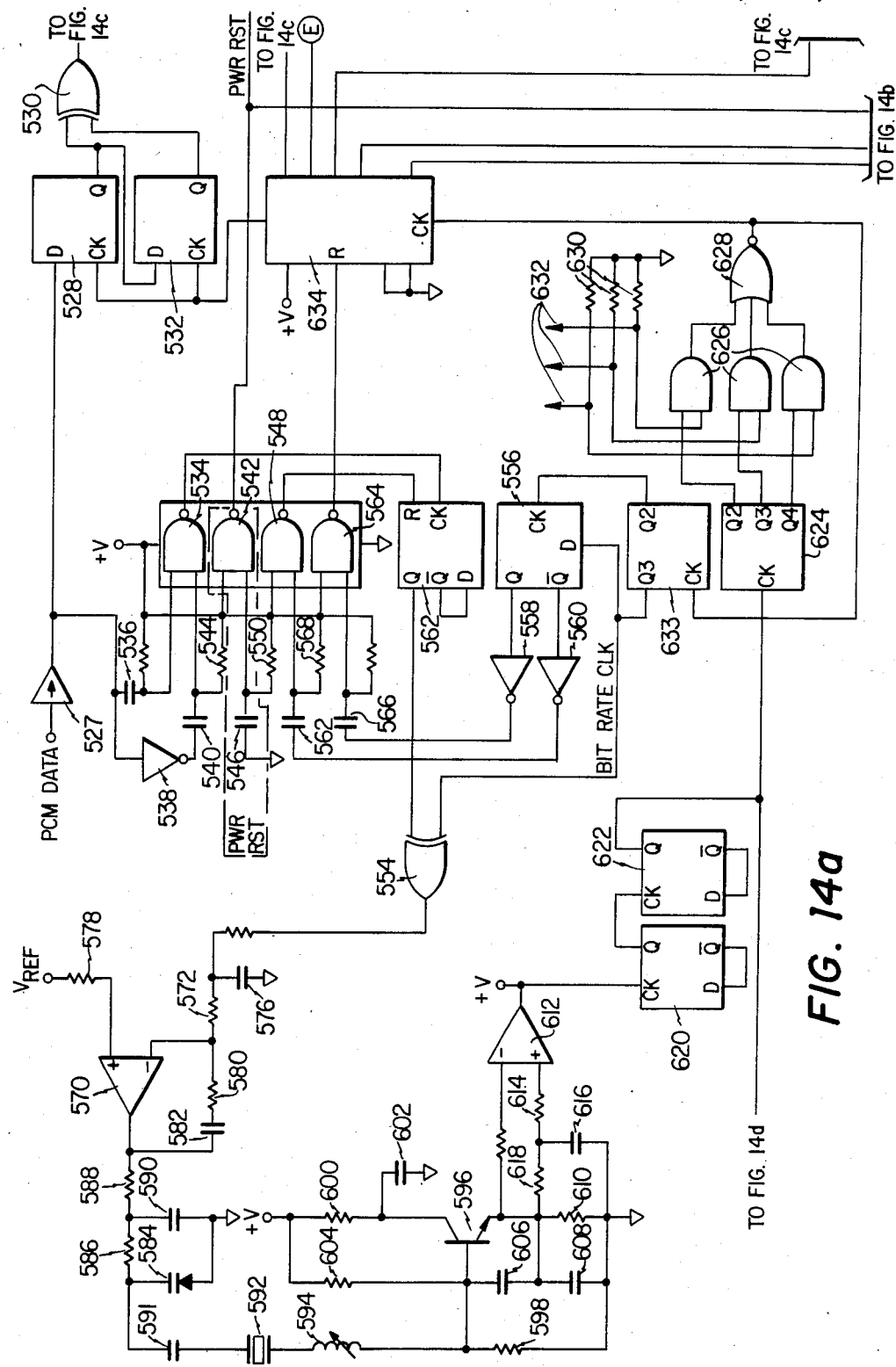
Figure 14B:
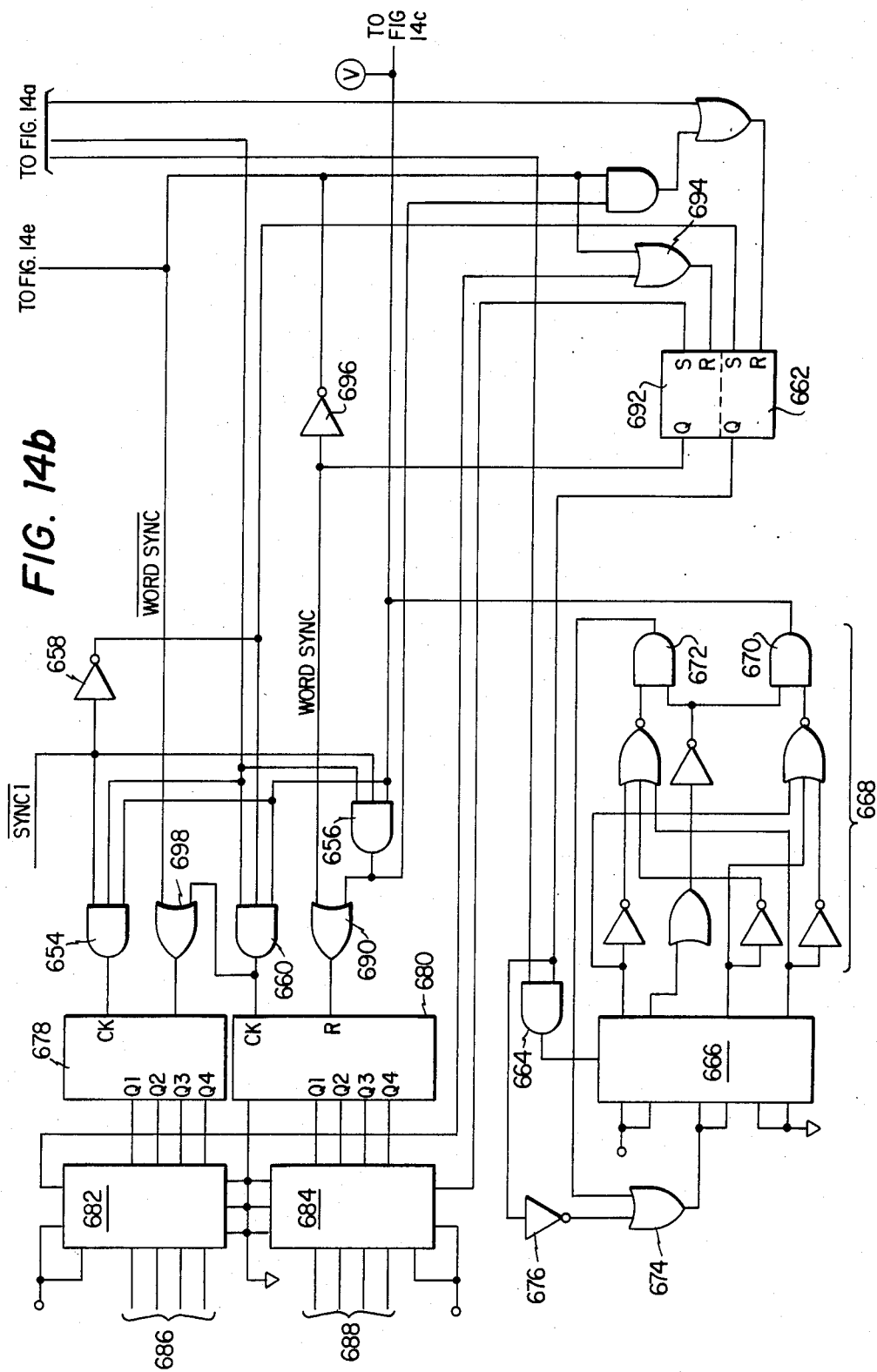
Figure 14C:
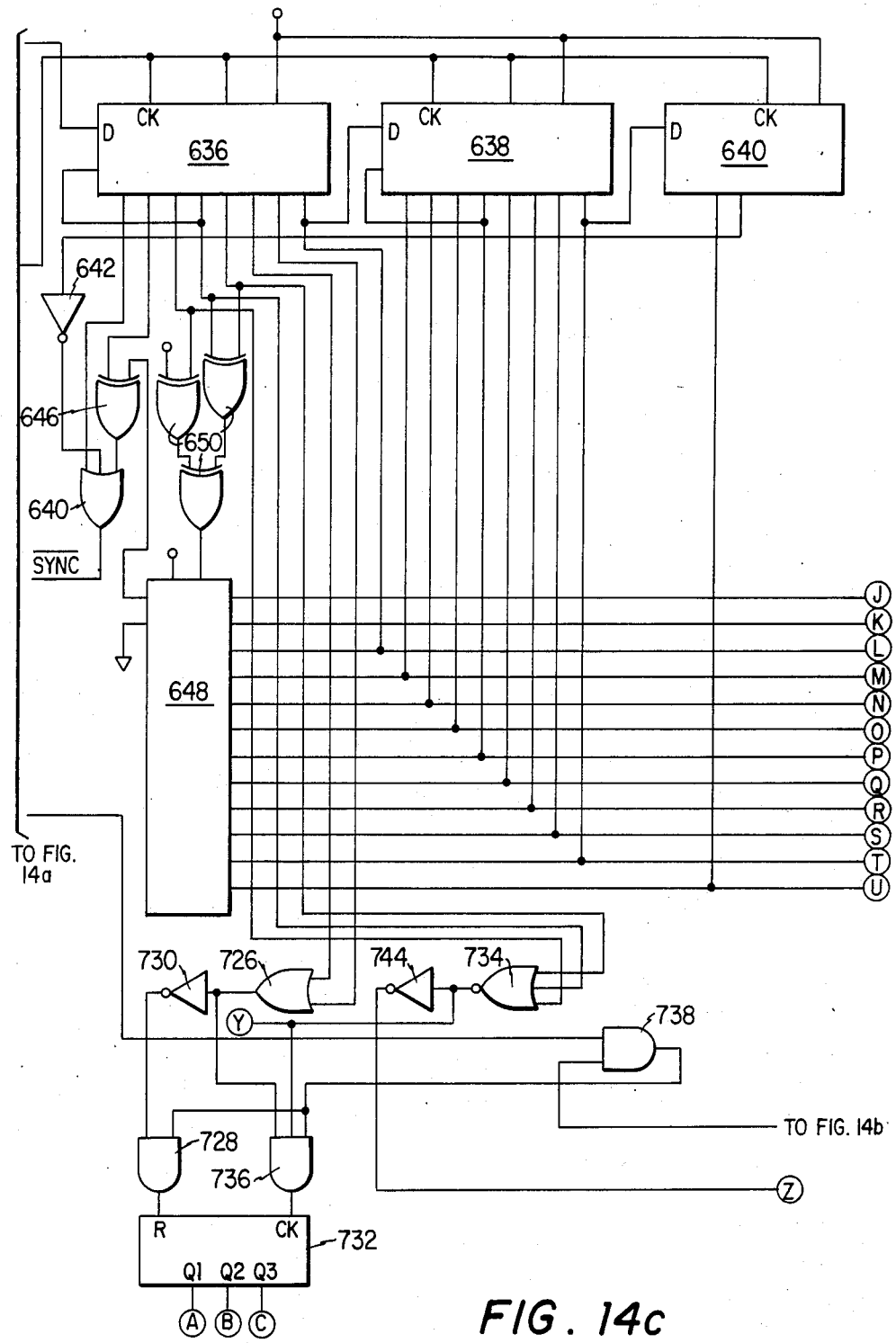
Figure 14E:
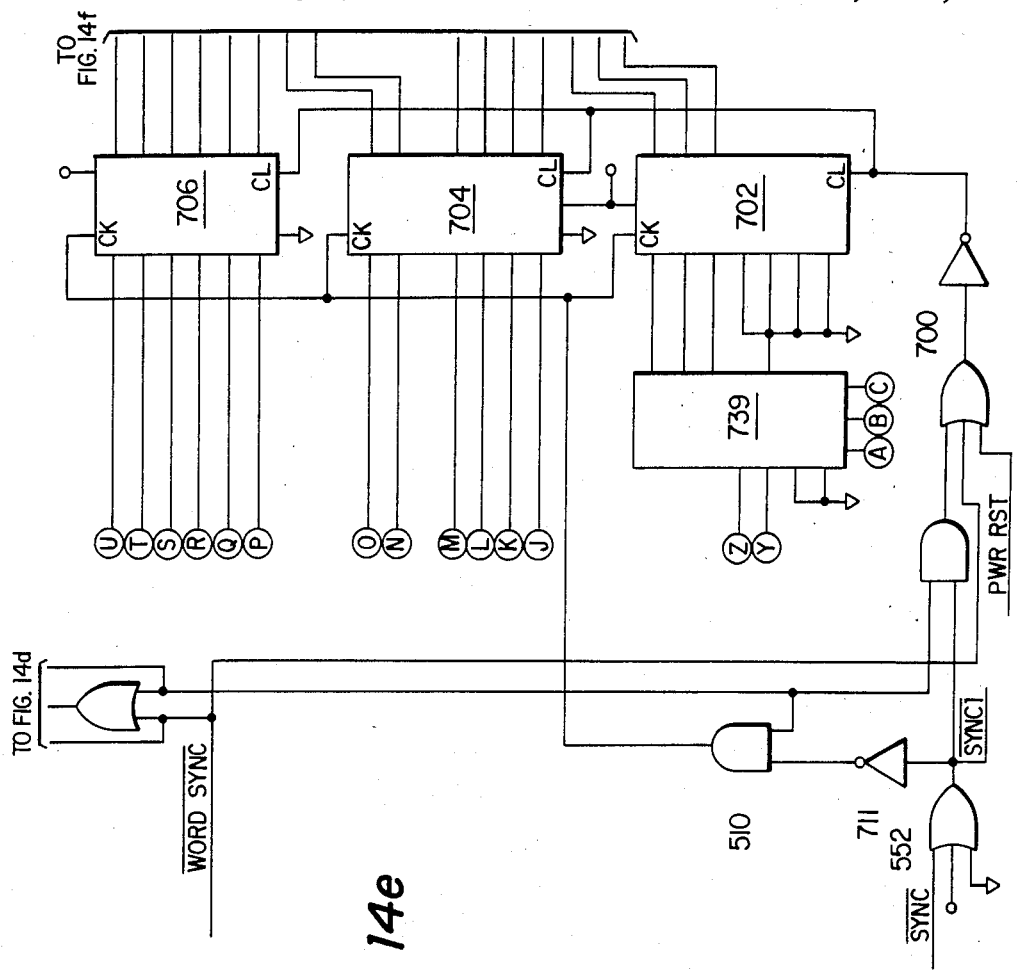

The signal $\overline{SYNC}$ is input to a three-input OR gate 552 to provide a synchronizing signal SYNC1 output therefrom, as illustrated in FIG. 14e. The $\overline{SYNC}$ signal is input to one input of AND gates 654 and 656 and to the input of an inverter 658. The output of the inverter 658 is input to one input of an AND gate 660 and to the set input of a latch 662. The output of the latch 662 is a count enable signal which is input to an AND gate 664, the other input of which is connected to one of the outputs of the octal counter 634. The output of the AND gate 664 is connected to a counter 666 which provides a modulo 18 count. The counter 666 has its outputs thereof connected to a group of logic circuitry 668 that includes an AND gate 670 for decoding count 1 of the modulo 18 and an AND gate 672 for decoding count 18 of the modulo 18 counter. The decoded count 18 from AND gate 672 is input to one input of an OR gate 674, the output of which is input to the reset input of the counter 666. The other input of the OR gate 674 is connected to the count enable output of the latch 662 through an inverter 676. Therefore, the modulo 18 counter 666 is reset if no $\overline{SYNC}$ signal is received by the latch 662 or count 18 is counted by the counter 666.

The decoded bit 1 output by AND gate 670 is connected to one input of AND gates 654, 656 and 660. The output of gate 654 is input to the clock input of an up counter 678 and the output of the gate 660 is input to the clock input of a counter 680. The remaining input of the gate 654 is connected to one output of the octal counter 634 and the remaining input of the gate 660 is connected to the output of the inverter 658. The counter 680 is incremented when count 1 of the modulo 18 counter and the $\overline{SYNC}$ signal are present. This is referred to as the good SYNC counter. The counter 678 is incremented when bit one of the modulo 18 counter is present and $\overline{SYNC}$ is present.

The outputs of the counters 678 and 680 are connected to magnitude comparators 682 and 684, respectively. The magnitude comparators 682 and 684 compare the outputs of the counters 678 and 680, respectively, with external references. The comparator 682 compares a bad SYNC count with an external reference on lines 686 and the comparator 684 compares a good SYNC count with an external reference on lines 688. A predetermined number of counts input on either of the lines 686 or 688 will determine the number of good or bad SYNCs that will create an output from the comparators 682 and 684. For example, if five good SYNC counts are required, there will have to be five successive good SYNC signals present on five successive words to allow the comparator 684 to output a signal. If a bad SYNC is encountered, the reset input of the counter 680 is reset by an OR gate 690 which receives its input from the AND gate 656 and a latch 692. The latch 692 has the set input thereof connected to the output of the comparator 684 and the reset input thereof connected to the output of an OR gate 694 which ORs the output from the comparator 682 and the inverted output of the latch 692 that is inverted by an inverter 696. Therefore, a bad SYNC count will reset the counter 680. The counter 678, on the other hand, is reset by a good SYNC and is connected to the output of an OR gate 698, the inputs of which are connected to the output of the inverter 696. The signal output by the latch 692 is labeled WORD SYNC and indicates when the good SYNC counter has a sufficient number of good counts to provide SYNC. Therefore, the counter 678 is reset on a good SYNC being detected. Therefore, the counters 678 and 680 are operable to provide the WORD SYNC signal after a predetermined number of good SYNCs has been counted and the WORD SYNC signal will remain until a predetermined number of bad counts has been counted. The number of good and bad counts required is set external to the circuit.

The $\overline{\text{WORD SYNC}}$ signal output by the inverter 696 is connected to the input of an OR gate 700 which has another input thereof connected to a PWR RST signal which is output by the Schmidt trigger 542. The output of the OR gate 700 is input to the CLEAR input of latches 702, 704 and 706 through an inverter 708. Therefore, the presence of the $\overline{\text{WORD SYNC}}$ signal CLEARS the latches 702–706. The clock inputs of the latches 702–706 are connected to the output of an AND gate 710, one input of which is connected to the gated $\overline{\text{SYNC}}$ signal through an inverter 711 and the other input of which is connected to the output of a counter 712. The counter 712 has the clock input thereof connected to the output of the flip flop 622 to receive the divided down clock signal and the reset input thereof connected to the output of an AND gate 714. The input of the AND gate 714 is connected to the output of the AND gate 670 which detects count 1 from the modulo 18 counter and the other input of the AND gate 714 is connected to the fifth sequential bit output by the octal counter 636 and marked "E". Therefore, the presence of SYNC allows the counted down clock frequency out of the counter 712 to latch the data into the latches 702–706. The inputs to the latches 702–706 are connected to the outputs of the shift registers 636–640 represented by the letters J through U which is a 12-bit data word.

The output of the latches 702–706 are input to tri-state latches 716 and 718. Tri-state latches 716 and 718 are operable to "latch through" the data when the appropriate signals are received. The output of the latches 716 and 718 are connected to the data bus 68. The latches 716 and 718 are operated by a channel enable signal CHEN which is input to an OR gate 720 and then to the enable input of the latches 716 and 718. A channel reset signal CHRST is input to an AND gate 722, the other input of which is connected to the enable inputs of the latches 716 and 718 and the output of which is connected to the reset inputs thereof. The CHEN and CHRST signals are signals which are externally supplied by the external storage/control 70. This allows the external control 70 to place the data that is stored in the latches 716–718 onto the bus 68. Since a number of PCM receivers are being sampled, the bus 68 is multiplexed and the data can only be put on the bus 68 in specified time slots. To prevent loading of new data into the latches 716 and 718 while the contents of the latches 702–706 are changing, a latch 724 is provided that has the set and reset inputs connected to the outputs of the counter 712 and the output thereof connected to the other input of the NOR gate 721 which prevents latches 716 and 718 from updating until their outputs are no longer enabled to drive the data bus 68.

Frame Synchronization

As described above, status words are sent in frames of eight words and must be decoded in sequence to determine which word is associated with which particular status parameter. Referring to FIG. 14c, bits 12 and 13 output by shift register 636 are input to an OR gate 726, the output of which is connected to an AND gate 728 through an inverter 730. The output of the AND gate 728 is input to the reset input of a counter 732. Bits 14, 15 and 16 are input to the inputs of a NOR gate 734, the output of which is connected to one input of an AND gate 736. The other inputs of the AND gate 736 are connected to the inputs of the AND gate 728. One of the inputs of the AND gate 736 is operated by the pulses out of the octal counter 636 through an AND gate 738. Therefore, when there are three logic "0"'s in bits 14, 15 and 16 and bits 12 and 13 are logic "0", the counter is reset which is the case when the zero word occurs, that is, the first to occur word. These are the identifier bits. When a logic "1" occurs in one of the bits 12 and 13, the octal counter 634 controls the clocking of the counter 732.

After word synchronization is achieved, the first digital word in the frame can be determined by examining the identifier bits and recognizing that there are two logic "0"'s therein. The remainder of the status words have a logic "1" in one of the identifier bits and can be distinguished therefrom. A counter is initiated upon sensing the first word in the frame and then the remaining seven counts for the seven remaining words is effected. At the end of this count, the counter is reset and a new frame examined. The word that is put out on the data bus is a status word rather than a data word. In this manner, a plurality of different parameters of the remote data acquisition unit can be stored in the external unit 70 to determine the status of the remote units.

Channel Skew

Referring now to FIG. 15, there is illustrated a timing diagram for the relative skew between channels. Since each of the DAU's 14 operates on an independent asynchronous internal clock with respect to each other, some long term drift does exist between the individual clocks. After a number of digital words have been transmitted, the drift in the clock frequency results in skew between the relative positions of the digital words in each of the DAU's 14. An update pulse is generated by each of the digital receivers and synchronized with the occurrence of a digital word. FIG. 15 illustrates the periodic waveform for the update pulses in a number of digital receivers. To measure the relative skew with respect to various channels, the external storage/control device 70 generates a timing signal off of a clock that is common to all of the digital receivers. The generation of this timing signal is represented by a pulse 760 that occurs at a time T0. Upon occurrence of the pulse 760 at T0, the time between T0 and the occurrence of the update pulse on each of the channels in the digital receivers is measured. This is done by incrementing a dedicated counter from T0 until the occurrence of the update pulse and then storing the number of counts in the external storage/control device 70. This data can be retrieved later and a correction factor entered such that proper correlation of the data can be obtained therewith. The counter is internal to the digital receiver and is associated with only one of the DAU's 14, each DAU 14 or discrete channel, having a counter associated therewith. For example, an update pulse 762 occurs at a first time represented by an arrow 764. At a later time, an update pulse 766 occurs on another channel having a longer interval of time between T0 and the occurrence thereof, as represented by an arrow 768. The difference between the occurrence of the update pulse 762 and the occurrence of the update pulse 766 is the actual difference between the time that the data at the remote DAU's 14 was sampled. This difference of course, is the result of the drift in the internal clocks. However, when the digital words are stored in the external storage/control device 70, the digital words are aligned as if they all had the same clock, that is, there would be no skew. Since, in actuality, there may be a slight time difference between the sampling of one piece of data with respect to the other, this information is necessary such that the signal can be reconstructed.

Figure 14F:
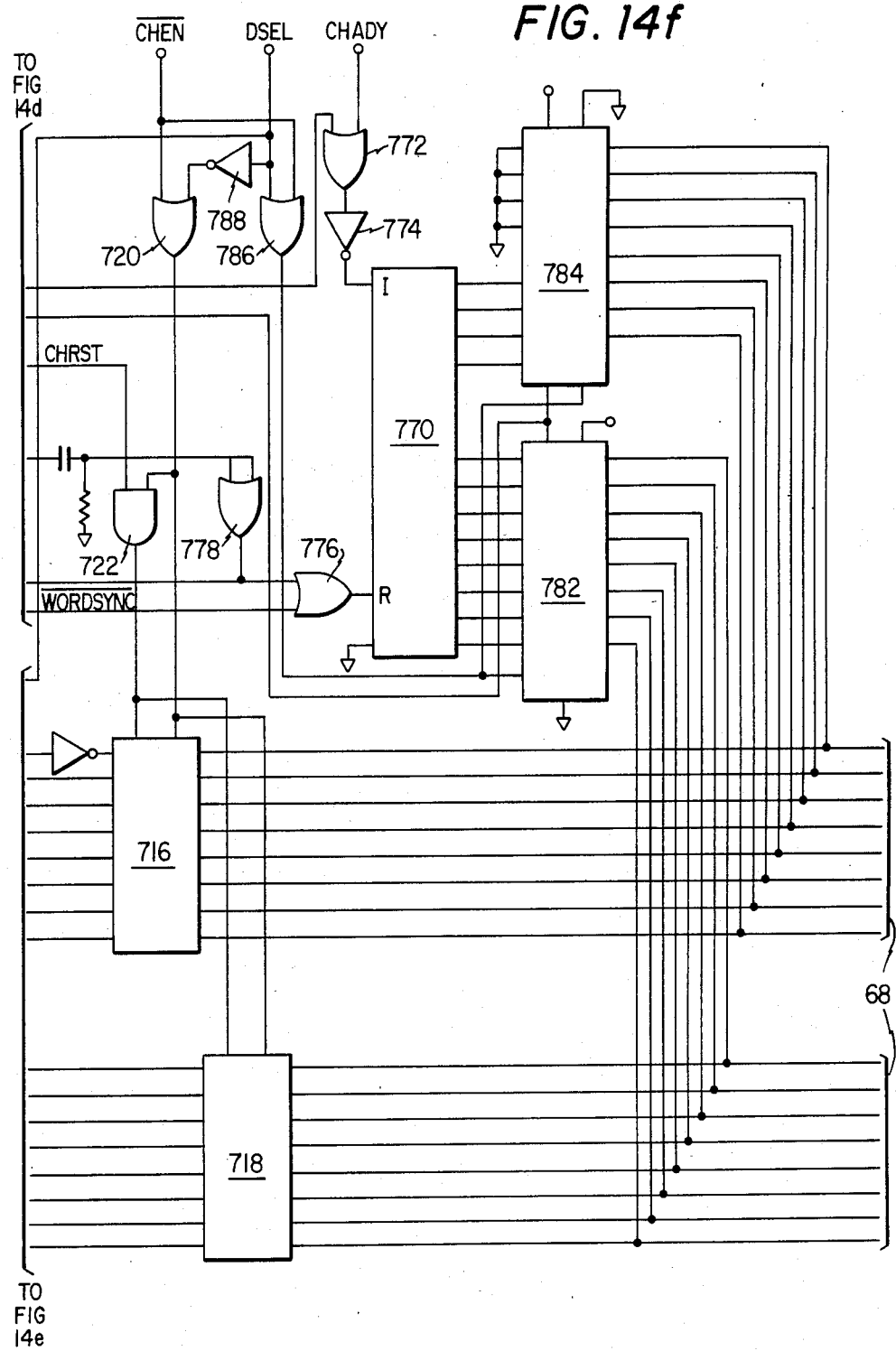

Referring further to FIG. 14f, a counter 770 receives a clock signal from a signal for a channel advance signal CHADV from the external storage/control 70. The CHADV signal is input through an OR gate 772 and an inverter 774. The reset input of the counter 770 is connected to the output of an OR gate 776, one input of which is connected to WORD SYNC. The other input thereof is connected through an OR gate 778 and an inverter 780 to the CHRST for channel reset. The counter is output to latches 782 and 784 that have a tri-state output connected to the data bus 68. The latches 782 and 784 are enabled by a DSEL signal that is input to one input of an OR gate 786, the other input of which is connected to the CHEN signal. Depending upon whether the skew counter is to be read or the data in the latches 702–is to be read, the output of the OR gate 786 will enable the latches 782 and 784. A data select signal DSEL is inverted by an inverter 788 for input to the other input of the OR gate 720 that receives the CHEN signal and enables the latches 716 and 718. Therefore, a counter can be initiated from a common time reference for a number of parallel channels and with a common clock to provide a reference number of counts for storage in association with a particular channel. An update pulse is taken off of the output of the counter 712 at the second pulse output therefrom which stops the counter from counting and stores the count therein to provide a reference with respect to the time T0.

Following is a list of all the preferred parts utilized in the above described schematic diagram:

| Item | Reference Numeral | Manufacturer | Part No. |
| --- | --- | --- | --- |
| Demodulator | 114 | Plessey | SL6600D |
| Squaring Circuit | 124 | RCA | CD4050 |
| Hex converter | 176-528 | RCA | CD4050 |
| Phase Detector | 126 | Motorola | MC1596G |
| Divider | 138 | Plessey | SP8659B |
| Op. Amp. | 146,298,318 | National | LM308 |
| DTMF converter | 160 | Silicon Sys. | SS1-201 |
| 4-16 Decoder | 186 | RCA | CD4515 |
| NAND gate | 188,204,216, 378,388 | RCA | CD4011 |

-continued

| Item | Reference Numeral | Manufacturer | Part No. |
| --- | --- | --- | --- |
| Op. Amp. | 190 | National | LM393N |
| Timer | 206 | Intersil | ICM5555 |
| Counter | 224-226 | RCA | CD40163B |
| NAND | 230,232 | RCA | CD4023 |
| NOR | 240,721,734, 772,778,786, 628 | RCA | CD4025 |
| NOR | 242 | RCA | CD4001 |
| Divider | 362,392 | Texas Instr. | 74L593 |
| Amplifier | 414,468,474, 476,570 | National | LF355 |
| Comparator | 490,612 | National | LM311 |
| D-type flip flop | 532,528,552, 556,620,622 | RCA | CD4013 |
| Quad Schmidt Trigger | 534,542, 564,548 | RCA | |
| Inverter | 538,558,560, 642,634,666, 730,744,788, 780,774 | RCA | CD4069 |
| Up Counter | 624,634,666, 678,680 | RCA | CD4520 |
| AND | 626,664,670, 677,710,714, 722,728,738, 752 | RCA | CD4081 |
| 3-Input NOR | 628 | RCA | CD4025 |
| Octal counter | 636,712 | RCA | CD4022 |
| Statis Shift Reg. | 636,638,640 | RCA | CD4015 |
| OR gate | 644,674,720, 726,690,694, 698 | RCA | CD4075 |
| 3-Input AND | 654,656,660 736 | RCA | CD4073 |
| Magnitude Comp. | 682,684 | National | MM74C85 |
| Latch | 662,692,724 | RCA | CD4043 |
| Latch | 702,704,706 | National | 74C14 |
| Latch | 716,718, 782,784 | National | 74C374 |
| UP/DOWN Ctr. | 740 | RCA | CD4516 |
| Counter | 770 | RCA | CD4040 |

In summary, there has been described a real time seismic telemetry system that samples data at a predetermined rate for quantization as digital words and subsequent transmission thereof over a data link. The digital words are encoded such that they only require the minimum number of bits with predetermined bits thereof utilized as identifier or synchronizing bits. To generate all of the data words at a bit rate that is approximately equal, the remote seismic units are synchronized prior to collecting and sending data. A synchronizing signal is transmitted from a central station to the remote units and the remote units synchronize their local clocks thereto. After synchronization of the individual clocks therein, the units become asynchronous again with respect to each other. Each of the remote units transmit on a discrete channel and the central station has receivers that are tuned to each of the discrete channels. After reception and decoding of the data, a system clock is synchronized to the bit rate of the digital bit stream transmitted. After synchronization to the bit stream, word synchronization must occur to determine the beginning and end of each digital word. This is accomplished by recognizing the identifier or synchronizer bits in each of the words and the occurrence thereof. By isolating a number of bits equal to the length of the digital word and sampling the bits at the appropriate location in the digital word, synchronization can be effected. Once synchronization is effected, the digital word representative of the data can be multiplexed on to a common bus for storage in a remote storage device.

Although the preferred embodiment has been described in detail, it should be understood that various changes, substitutions and alterations can be made therein without departing from the spirit and scope of the invention as defined by the appended Claims.

What is claimed is:

1. A synchronizing system for a seismic telemetry system, comprising:
   a central station;
   means at said central station for receiving and processing digitally encoded data from a plurality of channels in real time;
   a data link connected to said central station for accommodating said channels;
   means at said central station for transmitting a synchronizing signal over said data link referenced to a common time base;
   a plurality of remote data acquisition units each associated with one of said channels for transmitting digitally encoded data over said data link, each of said data acquisition units having:
   means for generating a local clock, each of said means for generating being asynchronous with respect to the others of said means for generating,
   receiver means for synchronizing said synchronizing signal,
   synchronizing means for synchronizing each of said generating means to said common time base in response to the presence of said synchronizing signal, each of said generating means maintaining its asynchronous operation when said synchronizing signal is removed, and
   means for collecting and digitally encoding data for transmission to said central station over said data link on said associated channel at a data rate referenced to said local clock after synchronization.

2. The seismic telemetry system of claim 1 wherein said generating means comprises a crystal controlled oscillator circuit for generating a stable reference frequency.

3. The seismic telemetry system of claim 2 wherein said synchronizing means comprises means for dividing the frequency of said oscillator circuit, said dividing means responsive to said synchronizing signal to initiate the dividing operation upon said oscillator at a predetermined output phase from said divider means.

4. The seismic telemetry system of claim 1 wherein said synchronizing signal consists of a single frequency analog signal and said synchronizing means comprises:
   means for selecting said synchronizing signal from said receiver means;
   means for generating a periodic signal that occurs once for each cycle of said synchronizing signal; and
   means for resetting said clock generating means to initiate the clocking operation thereof at a predetermined phase in response to the occurrence of said periodic signal such that said clock generating means is initiated for each cycle of said synchronizing signal.

5. The seismic telemetry system of claim 4 wherein said clock generating means comprises a stabilized reference oscillator having a higher frequency than the desired clocking frequency and a divider for dividing the frequency of said reference oscillator to the desired clocking frequency.

6. The seismic telemetry system of claim 5 wherein said means for initiating comprises reset circuitry connected to said divider for initiating division at a predetermined phase of said reference oscillator, the period of said reference oscillator equal to the maximum error between the phase of said clock generating means and said synchronizing signals.

7. The seismic telemetry system of claim 4 wherein the predetermined phase at which said clock generating means is initiated is essentially equal to zero degrees.

8. The seismic telemetry system of claim 4 wherein the frequency of said periodic signal generating means is equal to the bit rate of the digitally encoded data.

9. The seismic telemetry system of claim 1 wherein said means for transmitting further transmits a pre-synchronous signal for reception by said receiver means of each of said data acquisition units, each of said data acquisition units having means for inhibiting said synchronizing means until said pre-synchronous signal is received, reception of said pre-synchronous signal allowing said synchronizing means to receive said synchronizing signal.

10. The apparatus of claim 9 wherein said means for inhibiting comprises a gate circuit for gating said synchronizing signal after reception thereof and a timer for operating said gate circuit for a predetermined interval of time after reception of said pre-synchronous signal.

11. A system for synchronizing a seismic telemetry system, comprising:
    a data link for accommodating a plurality of channels;
    a central command station having:
    means for receiving digitally encoded data from said plurality of channels through said data link, and
    means for transmitting a synchronizing signal over said data link;
    a plurality of remote data acquisition units, each of said remote data acquisition units associated with one of said channels and having:
    means for generating a clock frequency,
    means for collecting seismic data,
    means for digitally encoding said collected seismic data, said encoded data having the bit rate thereof referenced to said clock frequency,
    means for transmitting said encoded data over said data link,
    means for receiving said synchronous signal, and
    synchronizing means for synchronizing the phase of said clock generating means in response to said synchronizing signal such that the clock frequencies in all of said data acquisition units are synchronized when said synchronizing signal is present and asynchronous when said synchronizing signal is not present.

12. The seismic telemetry system of claim 11 wherein said synchronizing means synchronizes the clock frequency at a predetermined phase for each cycle when said synchronizing signal is present.

13. The seismic telemetry system of claim 12 wherein said predetermined phase is essentially zero degrees.

14. The seismic telemetry system of claim 11 wherein said clock generating means comprises:
    a stabilized reference oscillator having a higher frequency than the clock frequency; and
    means for dividing the frequency of said reference oscillator to the desired clock frequency.

15. The seismic telemetry system of claim 14 wherein said synchronizing means comprises reset circuitry for resetting said dividing means to initiate the clock frequency output therefrom upon the occurrence of a predetermined phase of said reference oscillator such that the maximum error between said clock means and said synchronizing signal is equal to one period of said reference oscillator.

16. The seismic telemetry system of claim 11 further comprising a pre-synchronization signal for transmission by said transmitting means in said command station and each of said data acquisition units having means for gating said synchronizing signal to said synchronization means when said pre-synchronizing signal precedes said synchronizing signal, said gating means gating said synchronization signal to said synchronization means for a predetermined interval of time.

17. A system for synchronizing a seismic telemetry system, comprising:
a data link for transmission of digitally encoded data over a plurality of channels;
a command station having:
means for receiving encoded data from said data link, and
means for transmitting a synchronizing signal referenced to a common time base and a pre-synchronizing signal over said data link;
a plurality of remotely disposed data acquisition units, each of said data acquisition units associated with one of said channels and having:
a reference oscillator,
a divider circuit for dividing the frequency of said reference oscillator to a desired clock frequency,
means for digitally encoding seismic data, said encoded data having the bit rate thereof referenced to said clock frequency,
a transmitter for transmitting said encoded data over said data link,
a receiver for receiving said synchronization signal and said pre-synchronization signal from said data link,
a timer for initiating a pulse with a predetermined width in response to reception of said pre-synchronization signal,
means for generating a plurality of reset pulses in response to the presence of said synchronization signal during the time interval that said pulse would be generated by said timer, said reset pulses input to said divider for resetting thereof such that the division of the output of said reference oscillator is begun upon the occurrence of a predetermined phase of said reference oscillator after said divider has been reset by said reset pulses wherein the maximum error between the clock frequency in said data acquisition units and the synchronization signal is equal to one period of said reference oscillator.

18. A method for synchronizing data transmission in a real time seismic telemetry system, comprising:
receiving encoded data at a central location from a plurality of remote data acquisition units over a data link;
transmitting a synchronizing signal referenced to a common time base over the data link to the data acquisition units;
generating a clock frequency at each of the data acquisition units on a separate time base;
digitally encoding seismic data having the bit rate thereof referenced to the generated clock frequency;
transmitting the encoded data over the data link;
receiving the synchronization signal; and
synchronizing the phase of the clock frequency in response to the synchronizing signal such that all of the clock frequencies in all of the data acquisition units are synchronized to the common time base when the synchronizing signal is present and asynchronous when the synchronizing signal is not present, synchronization occurring before transmitting of data.

19. The method of claim 18 further comprising transmitting a pre-synchronous signal in conjunction with the synchronizing signal over the data link from the central location and receiving the pre-synchronous signal at each of the data acquisition units, synchronization of the clock frequencies inhibited unless the pre-synchronization signal precedes the synchronizing signal.

20. The method of claim 19 wherein the pre-synchronization signal is encoded and the data acquisition unit decodes the encoded pre-synchronization signal to generate a gating signal, the gating signal gating the synchronization signal to allow synchronization of the clock frequencies for a predetermined interval of time.

* * * * *